United States Patent
Kim et al.

(10) Patent No.: US 12,525,057 B2
(45) Date of Patent: Jan. 13, 2026

(54) FACE RECOGNITION SYSTEM USING QUALITY ADAPTIVE MARGINS AND METHOD OF PERFORMING THE SAME

(71) Applicant: Board of Trustees of Michigan State University, East Lansing, MI (US)

(72) Inventors: Minchul Kim, East Lansing, MI (US); Anil K. Jain, Okemos, MI (US); Xiaoming Liu, Okemos, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 398 days.

(21) Appl. No.: 18/125,364

(22) Filed: Mar. 23, 2023

(65) Prior Publication Data
US 2023/0306785 A1   Sep. 28, 2023

Related U.S. Application Data

(60) Provisional application No. 63/323,107, filed on Mar. 24, 2022.

(51) Int. Cl.
*G06V 40/16*   (2022.01)
*G06V 10/764*   (2022.01)
*G06V 10/98*   (2022.01)

(52) U.S. Cl.
CPC .......... *G06V 40/172* (2022.01); *G06V 10/764* (2022.01); *G06V 10/993* (2022.01)

(58) Field of Classification Search
CPC ... G06V 10/764; G06V 10/993; G06V 40/172
See application file for complete search history.

(56) References Cited

U.S. PATENT DOCUMENTS

2018/0165554 A1*   6/2018   Zhang ................... G06N 3/045

OTHER PUBLICATIONS

Meng et al: "MagFace: A Universal Representation for Face Recognition and Quality Assessment", CVPR 2021 (Year: 2021).*
Sun et al: "An Equalized Margin Loss for Face Recognition", 2020 (Year: 2020).*
Yoshua Bengio, Jer' ome Louradour, Ronan Collobert, and Jason Weston. Curriculum learning. In Proceedings of the 26th Annual International Conference on Machine Learning, pp. 41-48, 2009: 1.
Jie Chang, Zhonghao Lan, Changmao Cheng, and Yichen Wei. Data uncertainty learning in face recognition. In Proceedings of the IEEE/CVF Conference on Computer Vision and Pattern Recognition, pp. 5710-5719, 2020. 4.

(Continued)

*Primary Examiner* — Ruiping Li
(74) *Attorney, Agent, or Firm* — Harness, Dickey & Pierce, P.L.C.

(57) ABSTRACT

A method of training a facial recognition system with a plurality of image samples of a training set includes determining an image quality of each of the image samples in the training set, assigning a margin function to each of the image samples based on the image quality of each image sample, classifying the image samples, determining a prediction, determining a loss based on the prediction and the margin function, generating gradients based on the loss and changing weights in the classifier based on the gradients.

26 Claims, 18 Drawing Sheets

(56) References Cited

OTHER PUBLICATIONS

Zhiyi Cheng, Xiatian Zhu, and Shaogang Gong. Low-resolution face recognition. In Asian Conference on Computer Vision, pp. 605-621. Springer, 2018. 7, 10.

Jiankang Deng, Jia Guo, Niannan Xue, and Stefanos Zafeiriou. ArcFace: Additive angular margin loss for deep face recognition. In Proceedings of the IEEE/CVF Conference on Computer Vision and Pattern Recognition, pp. 4690-4699, 2019. 1, 2, 3, 4, 5, 6, 7, 8, 9, 10.

Jiankang Deng, Jia Guo, Jing Yang, Alexandros Lattas, and Stefanos Zafeiriou. Variational prototype learning for deep face recognition. In Proceedings of the IEEE/CVF Conference on Computer Vision and Pattern Recognition, pp. 11906-11915, 2021. 1, 9, 10.

Jiankang Deng, Jia Guo, Debing Zhang, Yafeng Deng, Xiangju Lu, and Song Shi. Lightweight face recognition challenge. In Proceedings of the IEEE/CVF International Conference on Computer Vision Workshops, pp. 0-0, 2019. 7, 9, 10.

Yao Feng, Fan Wu, Xiaohu Shao, Yanfeng Wang, and Xi Zhou. Joint 3d face reconstruction and dense alignment with position map regression network. In European Conference on Computer Vision, pp. 534-551, 2018. 4.

Yandong Guo, Lei Zhang, Yuxiao Hu, Xiaodong He, and Jianfeng Gao. MS-Celeb-1M: A dataset and benchmark for large-scale face recognition. In European Conference on Computer Vision, pp. 87-102. Springer, 2016. 1.

Kaiming He, Xiangyu Zhang, Shaoqing Ren, and Jian Sun. Deep residual learning for image recognition. In Proceedings of the IEEE Conference on Computer Vision and Pattern Recognition, pp. 770-778, 2016. 7.

Tong He, Zhi Zhang, Hang Zhang, Zhongyue Zhang, Junyuan Xie, and Mu Li. Bag of tricks for image classification with convolutional neural networks. In Proceedings of the IEEE/CVF Conference on Computer Vision and Pattern Recognition, pp. 558-567, 2019, 8.

Gary B Huang, Marwan Mattar, Tamara Berg, and Eric Learned-Miller. Labeled Faces in the Wild: A database for studying face recognition in unconstrained environments. In Workshop on Faces in 'Real-Life' Images: Detection, Alignment, and Recognition, 2008. 1, 3, 7, 10.

Yuge Huang, Yuhan Wang, Ying Tai, Xiaoming Liu, Pengcheng Shen, Shaoxin Li, Jilin Li, and Feiyue Huang. CurricularFace:adaptive curriculum learning loss for deep face recognition. In Proceedings of the IEEE/CVF Conference on Computer Vision and Pattern Recognition, pp. 5901-5910, 2020. 1, 2, 3, 5, 7, 10.

Nathan D Kalka, Brianna Maze, James A Duncan, Kevin O'Connor, Stephen Elliott, Kaleb Hebert, Julia Bryan, and Anil K Jain. IJB-S: IARPA Janus Surveillance Video Benchmark. In 2018 IEEE 9th International Conference on Biometrics Theory, Applications and Systems (BTAS), pp. 1-9. IEEE, 2018. 1, 3, 7, 10.

Bong-Nam Kang, Yonghyun Kim, Bongjin Jun, and Daijin Kim. Attentional feature-pair relation networks for accurate face recognition. In Proceedings of the IEEE/CVF International Conference on Computer Vision, pp. 5472-5481, 2019. 10.

Yonghyun Kim, Wonpyo Park, and Jongju Shin. BroadFace: Looking at tens of thousands of people at once for face recognition. In European Conference on Computer Vision, pp. 536-552. Springer, 2020. 9, 10.

Shen Li, Jianqing Xu, Xiaqing Xu, Pengcheng Shen, Shaoxin Li, and Bryan Hooi. Spherical confidence learning for face recognition. In Proceedings of the IEEE/CVF Conference on Computer Vision and Pattern Recognition, pp. 15629-15637, 2021. 1, 4, 9, 10.

Tsung-Yi Lin, Priya Goyal, Ross Girshick, Kaiming He, and Piotr Dollar. Focal loss for dense object detection. In' Proceedings of the IEEE International Conference on Computer Vision, pp. 2980-2988, 2017. 3.

Jiaheng Liu, Yudong Wu, Yichao Wu, Chuming Li, Xiaolin Hu, Ding Liang, and Mengyu Wang. DAM: Discrepancy alignment metric for face recognition. In Proceedings of the IEEE/CVF International Conference on Computer Vision, pp. 3814-3823, 2021. 10.

Weiyang Liu, Yandong Wen, Zhiding Yu, Ming Li, Bhiksha Raj, and Le Song. SphereFace: Deep hypersphere embedding for face recognition. In Proceedings of the IEEE Conference on Computer Vision and Pattern Recognition, pp. 212-220, 2017. 2, 3, 4.

Ziwei Liu, Ping Luo, Xiaogang Wang, and Xiaoou Tang. Deep learning face attributes in the wild. In Proceedings of the IEEE International Conference on Computer Vision, pp. 3730-3738, 2015. 10.

Brianna Maze, Jocelyn Adams, James A Duncan, Nathan Kalka, Tim Miller, Charles Otto, Anil K Jain, W Tyler Niggel, Janet Anderson, Jordan Cheney, and Patrick Grother. IARPA Janus Benchmark-C: Face dataset and protocol. In 2018 International Conference on Biometrics (ICB), pp. 158-165. IEEE, 2018. 1, 3, 7, 10.

Qiang Meng, Shichao Zhao, Zhida Huang, and Feng Zhou. MagFace: A universal representation for face recognition and quality assessment. In Proceedings of the IEEE/CVF Conference on Computer Vision and Pattern Recognition, pp. 14225-14234, 2021. 3, 5, 10.

Anish Mittal, Anush Krishna Moorthy, and Alan Conrad Bovik. No-reference image quality assessment in the spatial domain. IEEE Transactions on Image Processing, 21 (12): 4695-4708, 2012, 6.

Stylianos Moschoglou, Athanasios Papaioannou, Christos Sagonas, Jiankang Deng, Irene Kotsia, and Stefanos Zafeiriou. AGEDB: the first manually collected, in-the-wild age database. In Proceedings of the IEEE the first manually collected, in-the-wild age database. In Proceedings of the IEEE Conference on Computer Vision and Pattern Recognition Workshops, pp. 51-59, 2017. 3, 7, 10.

Soumyadip Sengupta, Jun-Cheng Chen, Carlos Castillo, Vishal M Patel, Rama Chellappa, and David W Jacobs. Frontal to profile face verification in the wild. In 2016 IEEE Winter Conference on Applications of Computer Vision (WACV), pp. 1-9. IEEE, 2016. 1, 3, 7, 10.

Hamid R Sheikh and Alan C Bovik. Image information and visual quality. IEEE Transactions on Image Processing, 15 (2):430-444, 2006. 1.

Yichun Shi and Anil K Jain. Probabilistic face embeddings. In Proceedings of the IEEE/CVF International Conference on Computer Vision, pp. 6902-6911, 2019. 4, 10.

Yichun Shi, Xiang Yu, Kihyuk Sohn, Manmohan Chandraker, and Anil K Jain. Towards universal representation learning for deep face recognition. In Proceedings of the IEEE/CVF Conference on Computer Vision and Pattern Recognition, pp. 6817-6826, 2020. 4, 7, 10.

Abhinav Shrivastava, Abhinav Gupta, and Ross Girshick. Training region-based object detectors with online hard example mining. In Proceedings of the IEEE Conference on Computer Vision and Pattern Recognition, pp. 761-769, 2016. 3.

Philipp Terhorst, Jan Niklas Kolf, Naser Damer, Florian Kirchbuchner, and Arjan Kuijper. Ser-fiq: unsupervised estimation of face image quality based on stochastic embedding robustness. in 2020 IEEE. In CVF Conference on Computer Vision and Pattern Recognition, CVPR, pp. 13-19, 2020. 6.

Feng Wang, Xiang Xiang, Jian Cheng, and Alan Loddon Yuille. NormFace: L2 hypersphere embedding for face verification. In Proceedings of the 25th ACM International Conference on Multimedia, pp. 1041-1049, 2017. 4.

Hao Wang, Yitong Wang, Zheng Zhou, Xing Ji, Dihong Gong, Jingchao Zhou, Zhifeng Li, and Wei Liu. CosFace: Large margin cosine loss for deep face recognition. In Proceedings of the IEEE Conference on Computer Vision and Pattern Recognition, pp. 5265-5274, 2018. 2, 3, 4, 5, 8, 10.

Xiaobo Wang, Shifeng Zhang, Shuo Wang, Tianyu Fu, Hailin Shi, and Tao Mei. Mis-classified vector guided softmax loss for face recognition. In Proceedings of the AAAI Conference on Artificial Intelligence, vol. 34, pp. 12241-12248, 2020. 3, 10.

Cameron Whitelam, Emma Taborsky, Austin Blanton, Brianna Maze, Jocelyn Adams, Tim Miller, Nathan Kalka, Anil K Jain, James A Duncan, Kristen Allen, et al. IARPA Janus Benchmark-B face dataset. In Proceedings of the IEEE Conference on Computer Vision and Pattern Recognition Workshops, pp. 90-98, 2017. 1, 3, 7, 10.

Guangtao Zhai and Xiongkuo Min. Perceptual image quality assessment: a survey. Science China Information Sciences, 63(11):211301, 2020. 6.

(56) References Cited

OTHER PUBLICATIONS

Kaipeng Zhang, Zhanpeng Zhang, Zhifeng Li, and Yu Qiao. Joint face detection and alignment using multitask cascaded convolutional networks. IEEE Signal Processing Letters, 23(10):1499-1503, 2016. 7.

Xiao Zhang, Rui Zhao, Yu Qiao, Xiaogang Wang, and Hongsheng Li. Adacos: Adaptively scaling cosine logits for effectively learning deep face representations. In Proceedings of the IEEE/CVF Conference on Computer Vision and Pattern Recognition, pp. 10823-10832, 2019. 3.

Xiao Zhang, Rui Zhao, Junjie Yan, Mengya Gao, Yu Qiao, Xiaogang Wang, and Hongsheng Li. P2sGrad: Refined gradients for optimizing deep face models. In Proceedings of the IEEE/CVF Conference on Computer Vision and Pattern Recognition, pp. 9906-9914, 2019. 3.

Tianyue Zheng and Weihong Deng. Cross-Pose LFW: A database for studying cross-pose face recognition in unconstrained environments. Beijing University of Posts and Telecommunications, Tech. Rep, 5:7, 2018. 3, 7, 10.

Tianyue Zheng, Weihong Deng, and Jiani Hu. Cross-Age LFW: A database for studying cross-age face recognition in unconstrained environments. CoRR, abs/1708.08197, 2017. 3, 7, 10.

Zheng Zhu, Guan Huang, Jiankang Deng, Yun Ye, Junjie Huang, Xinze Chen, Jiagang Zhu, Tian Yang, Jiwen Lu, Dalong Du, et al. WebFace260M: A benchmark unveiling the power of million-scale deep face recognition. In Proceedings of the IEEE/CVF Conference on Computer Vision and Pattern Recognition, pp. 10492-10502, 2021. 7, 10.

InsightFace. https://github.com/deepinsight/insightface.git. Retrieved: Sep. 1, 2021. 7.

InsightFacePytorch. https://github.com/TreB1eN/InsightFace_Pytorch. git. Retrieved: Sep. 1, 2021. 7.

TFace. https://github.com/Tencent/TFace.git. Retrieved: Oct. 3, 2021. 7.

Jiankang Deng, Jia Guo, Niannan Xue, and Stefanos Zafeiriou. ArcFace: Additive angular margin loss for deep face recognition. In Proceedings of the IEEE/CVF Conference on Computer Vision and Pattern Recognition, pp. 4690-4699, 2019. 1, 2, 3, 4, 5, 7.

Gary B Huang, Marwan Mattar, Tamara Berg, and Eric Learned-Miller. Labeled Faces in the Wild: A database forstudying face recognition in unconstrained environments. In Workshop on Faces in'Real-Life'Images: Detection, Alignment, and Recognition, 2008. 7.

Yuge Huang, Yuhan Wang, Ying Tai, Xiaoming Liu, Pengcheng Shen, Shaoxin Li, Jilin Li, and Feiyue Huang. CurricularFace: adaptive curriculum learning loss for deep face recognition. In Proceedings of the IEEE/CVF Conference on Computer Vision and Pattern Recognition, pp. 5901-5910, 2020. 1, 2.

Insoo Kim, Seungju Han, Ji-won Baek, Seong-Jin Park, Jae-Joon Han, and Jinwoo Shin. Quality-agnostic image recognition via invertible decoder. In Proceedings of the IEEE/CVF Conference on Computer Vision and Pattern Recognition, pp. 12257-12266, 2021. 7.

Weiyang Liu, Yandong Wen, Zhiding Yu, Ming Li, Bhiksha Raj, and Le Song. SphereFace: Deep hypersphere embedding for face recognition. In Proceedings of the IEEE Conference on Computer Vision and Pattern Recognition, pp. 212-220, 2017. 2.

Brianna Maze, Jocelyn Adams, James A Duncan, Nathan Kalka, Tim Miller, Charles Otto, Anil K Jain, W Tyler Niggel, Janet Anderson, Jordan Cheney, and Patrick Grother. IARPA Janus Benchmark-C: Face dataset and protocol. In 2018 International Conference on Biometrics (ICB), pp. 158-165. IEEE, 2018. 5, 6, 7.

Qiang Meng, Shichao Zhao, Zhida Huang, and Feng Zhou. MagFace: A universal representation for face recognition and quality assessment. In Proceedings of the IEEE/CVF Conference on Computer Vision and Pattern Recognition, pp. 14225-14234, 2021. 1, 3.

Stylianos Moschoglou, Athanasios Papaioannou, Christos Sagonas, Jiankang Deng, Irene Kotsia, and Stefanos Zafeiriou. AGEDB:the first manually collected, in-the-wild age database. In Proceedings of the IEEE Conference on Computer Vision and Pattern Recognition Workshops, pp. 51-59, 2017. 7.

Soumyadip Sengupta, Jun-Cheng Chen, Carlos Castillo, Vishal M Patel, Rama Chellappa, and David W Jacobs. Frontal to profile face verification in the wild. In 2016 IEEE Winter Conference on Applications of Computer Vision (WACV), pp. 1-9. IEEE, 2016. 7.

Hao Wang, Yitong Wang, Zheng Zhou, Xing Ji, Dihong Gong, Jingchao Zhou, Zhifeng Li, and Wei Liu. CosFace: Large margin cosine loss for deep face recognition. In Proceedings of the IEEE Conference on Computer Vision and Pattern Recognition, pp. 5265-5274, 2018. 1, 2.

Cameron Whitelam, Emma Taborsky, Austin Blanton, Brianna Maze, Jocelyn Adams, Tim Miller, Nathan Kalka, Anil K Jain, James A Duncan, Kristen Allen, et al. IARPA Janus Benchmark-B face dataset. In Proceedings of the IEEE Conference on Computer Vision and Pattern Recognition Workshops, pp. 90-98, 2017. 7.

Tianyue Zheng and Weihong Deng. Cross-Pose LFW: A database for studying cross-pose face recognition in unconstrained environments. Beijing University of Posts and Telecommunications, Tech. Rep, 5:7, 2018. 7.

Tianyue Zheng, Weihong Deng, and Jiani Hu. Cross-Age LFW: A database for studying cross-age face recognition in unconstrained environments. CoRR, abs/1708.08197, 2017. 7.

\* cited by examiner

High Quality

Prob. Output vs Img. Qual

Low Quality

Mixed Quality

| Method | h | m | Proxy | HQ Datasets | LQ Datasets |
|---|---|---|---|---|---|
| CurricularFace | - | 0.50 | | 93.43 | 32.92 |
| AdaFace | 0.22 | | | 93.67 | 34.92 |
| AdaFace | 0.33 | 0.40 | Norm | 93.74 | 35.40 |
| AdaFace | 0.66 | | | 93.70 | 35.29 |
| AdaFace | | 0.40 | | 93.74 | 35.40 |
| AdaFace | 0.33 | 0.50 | Norm | 93.56 | 35.23 |
| AdaFace | | 0.75 | | 93.37 | 35.69 |
| AdaFace | | | Norm | 93.74 | 34.40 |
| - | 0.33 | 0.40 | 1-BRISQUE | 93.43 | 34.55 |
| - | | | $P_{yi}$ | 93.46 | 34.17 |

FIG. 5E

| Method | p | HQ Datasets | LQ Datasets |
|---|---|---|---|
| CurricularFace | 0.0 | 96.85 | 41.00 |
| CurricularFace | 0.2 | 96.75 | 40.84 |
| CurricularFace | 0.3 | 96.59 | 40.58 |
| AdaFace | 0.0 | 96.72 | 40.95 |
| AdaFace | 0.2 | 96.88 | 41.82 |
| AdaFace | 0.3 | 96.78 | 41.93 |

FIG. 5F

| Methods | $f(\cos\theta_j)$ for $j \neq y_i$ | $f(\cos\theta_j)$ for $j = y_i$ | $g$ for $j = y_i$ |
|---|---|---|---|
| Softmax | $s \cdot \cos\theta_{y_i}$ | $s \cdot \cos\theta_{y_i}$ | $(P_{y_i}^{(i)} - 1) s$ |
| Additive Margin (CosFace [13]) | $s \cdot \cos\theta_{y_i}$ | $s(\cos\theta_{y_i} - m)$ | $(P_{y_i}^{(i)} - 1) s$ |
| Angular Margin (ArcFace [4]) | $s \cdot \cos\theta_{y_i}$ | $s(\cos\theta_{y_i} + m)$ | $(P_{y_i}^{(i)} - 1) s \left( \cos(m) + \dfrac{\cos\theta_{y_i} \sin(m)}{\sqrt{1-\cos^2\theta_{y_i}}} \right)$ |
| Adaptive Angular Margin | $s \cdot \cos\theta_{y_i}$ | $s \cdot \cos(\theta_{y_i} + m(\|Z_j\|))$ | $(P_{y_i}^{(i)} - 1) s \left( \cos(m(\|Z_j\|)) + \dfrac{\cos\theta_{y_i} \sin(m(\|Z_j\|))}{\sqrt{1-\cos^2\theta_{y_i}}} \right)$ |
| | $m(\|Z_j\|) = $ a monotonically inc. function of $(\|Z_j\|)$. In this table, $g$ is derived with $(\|Z_j\|)$ as a constant. | | |
| CurricularFace [6] | $N(t, \cos\theta_{y_i})$ | $s \cdot \cos(\theta_{y_i} + m)$ | $(P_{y_i}^{(i)} - 1) s \left( \cos(m) + \dfrac{\cos\theta_{y_i} \sin(m)}{\sqrt{1-\cos^2\theta_{y_i}}} \right)$ |
| | $N(t, \cos(\theta_{y_i})) = \cos(\theta_j)(t + \cos\theta_j)$ if $s \cos(\theta_{y_i} + m) < \cos(\theta_j)$ else $\cos(\theta_j)$ | | |
| AdaFace (ours) | $s \cdot \cos\theta_{y_i}$ | $s \cdot \cos(\theta_{y_i} + g_{angle}) - g_{add}$ | $(P_{y_i}^{(i)} - 1) s \left( \cos(g_{angle}) + \dfrac{\cos\theta_{y_i} \sin(g_{angle})}{\sqrt{1-\cos^2\theta_{y_i}}} \right)$ |
| | $g_{angle} = -m \cdot \widehat{\|Z_j\|}, \ g_{add} = m \cdot \widehat{\|Z_j\|} + m$ | | $\widehat{\|Z_j\|} = \left[ \dfrac{\|Z_j\| - \mu_z}{\sigma_z / h} \right]_{-1}^{1}$ |

FIG. 7

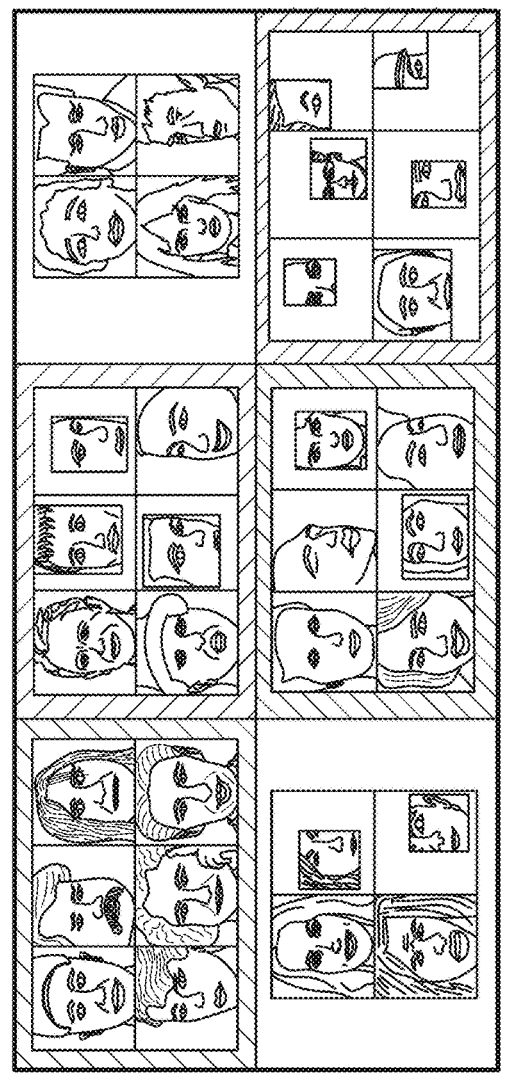
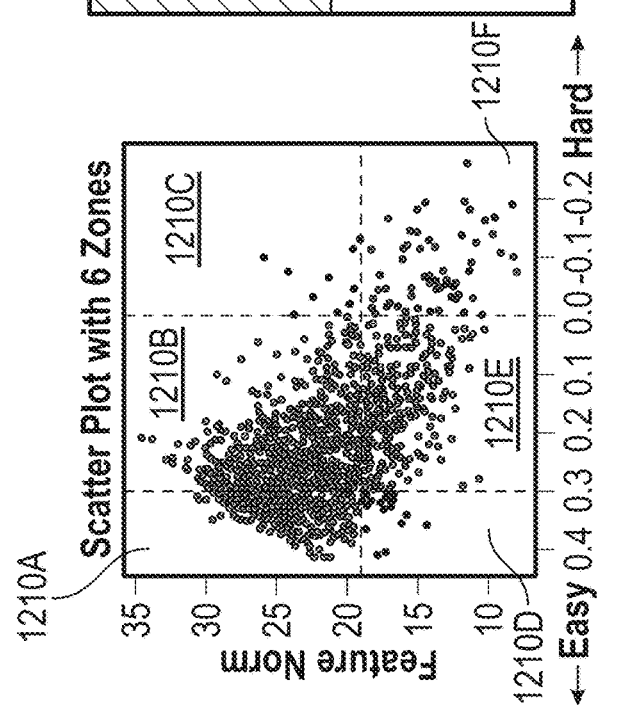
FIG. 12

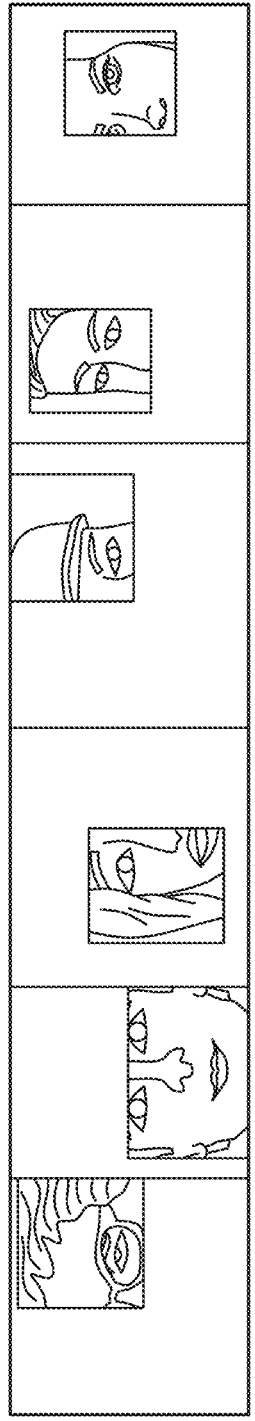
FIG. 13C

FACE RECOGNITION SYSTEM USING QUALITY ADAPTIVE MARGINS AND METHOD OF PERFORMING THE SAME

CROSS REFERENCE TO RELATED APPLICATIONS

This is a non-provisional application of provisional application 63/323,107 filed on Mar. 24, 2022, the disclosure of which is incorporated by reference herein. This application incorporates by reference herein the entire disclosures of provisional U.S. Ser. No. 62/803,784, filed on Feb. 11, 2019, U.S. Ser. No. 17/058,193, filed on Nov. 24, 2020, and U.S. Ser. No. 16/697,364, filed Nov. 27, 2019.

GOVERNMENT FUNDING

This invention was made with government support under W911NF-18-1-0330 awarded by the U.S. Army Research Laboratory. The government has certain rights in the invention.

FIELD

The present disclosure relates general to facial recognition system and, more particularly to a system and method for improving the performance of facial recognition systems by assigning different margin functions to samples based on the estimated image quality.

BACKGROUND

Image quality is a combination of attributes that indicates how faithfully an image captures the original scene. Factors that affect the image quality include but are not limited to brightness, contrast, sharpness, noise, color constancy, resolution and tone reproduction. Face images can be captured under a variety of settings for lighting, pose and facial expression, and sometimes under extreme visual changes such as the age or amount of make-up on a subject. These parameter settings make the recognition task difficult for learned face recognition (FR) models. Still, the task is achievable in the sense that humans or models can often recognize faces under these difficult settings. However, when a face image is of low quality, depending on the degree, the recognition task becomes infeasible.

FIG. 1 shows a table 10 having examples of both high quality in a first row 12 and low-quality face images in a second row 14. an easy to recognize column 16 a high-quality image in row 12. A second column 18 has hard to recognize images in both the high-quality row 12 and the low quality row 14. It is not possible to recognize the subjects in the last column 20 of FIG. 1.

Low quality images like the bottom row of FIG. 1 are increasingly becoming an important part of face recognition datasets because they are encountered in surveillance videos and drone footage. Various state-of-the-art facial recognition methods are able to obtain over 98% verification accuracy in relatively high-quality datasets such as LFW or CFP-FP. Recent facial recognition challenges have moved to poor quality datasets such as IJB-B, IJB-C and IJB-S. Although the challenge is to attain high accuracy on low quality datasets, most popular training datasets still remain comprised of high-quality images. Since only a small portion of training data is low quality, it is important to use it in a clever manner during training. Typical training models equally emphasize the different types of data in the data sets.

One problem with low quality face images is that they tend to be unrecognizable. When the image degradation is too large, the relevant identity information vanishes from the image, resulting in unidentifiable images. These unidentifiable images are detrimental to the training procedure since a model will try to exploit other visual characteristics, such as clothing color or image resolution, to lower the training loss. If these images are dominant in the distribution of low quality images, the model is likely to perform poorly on low quality datasets during testing.

SUMMARY

An improved facial recognition system facial recognition system which adaptively assigns importance to face training samples based on both sample image quality and sample recognition difficulty. Margin functions in margin-based SoftMax loss are able to scale the gradient based on sample difficulty during backpropagation training. Based on this finding, the disclosure adaptively assigns different margin functions to each sample via its estimated image quality. While feature norm is proposed as an approximation of image quality, any other image quality measure can be adopted as well.

A loss function is set forth to achieve the above goal in a seamless way. Feature norm was found to be a good proxy for the image quality. Various margin functions amount to assigning different importance to different difficulty of samples. These two findings are combined in a unified loss function in the system and process of present disclosure (referred to as AdaFace herein) that adaptively changes the margin function to assign different importance to different difficulty of samples, based on the image quality.

In one aspect of the disclosure, a method of training a facial recognition system with a plurality of image samples of a training set includes determining an image quality of each of the image samples in the training set, assigning a margin function to each of the image samples based on the image quality of each image sample, classifying the image samples, determining a prediction, determining a loss based on the prediction and the margin function, generating gradients based on the loss and changing weights in the classifier based on the gradients.

In one aspect of the disclosure, the loss function of AdaFace assigns different importance to different difficulty of samples according to their image quality. By incorporating image quality, emphasizing unidentifiable images is avoided while focusing on hard yet recognizable samples.

In another aspect of the disclosure, angular margin scales the learning signal (gradient) based on the training sample's difficulty. Based on this, the margin function is adaptively changed to emphasize hard samples if the image quality is high and ignore very hard samples (unidentifiable images) if the image quality is low.

In another aspect of the disclosure, feature norms can serve as the proxy of image quality. It bypasses the need for an additional module to estimate image quality. Thus, adaptive margin function is achieved without additional complexity.

The efficacy of the present disclosure was verified by extensive evaluations on nine datasets (LFW, CFP-FP, CPLFW, AgeDB, CALFW, IJB-B, IJB-C, IJB-S and Tiny-Face) of various qualities. The recognition performance on low quality datasets can be significantly increased while maintaining performance on high quality datasets.

DRAWINGS

The drawings described herein are for illustrative purposes only of selected embodiments and not all possible implementations, and are not intended to limit the scope of the present disclosure.

FIG. 5E is an ablation of margin function perimeters hm.

FIG. 5F is a table of ablation of augmentation probability p.

FIG. 7 is a table of various facial recognition methods and perimeters associated therewith.

FIG. 12 is a plot of actual training data corresponding to six zones of a training set which is coordinated on the plot.

FIG. 13C are illustrations of hard yet recognizable figures and unrecognizable figures.

Corresponding reference numerals indicate corresponding parts throughout the several views of the drawings.

DETAILED DESCRIPTION

Figure 1:
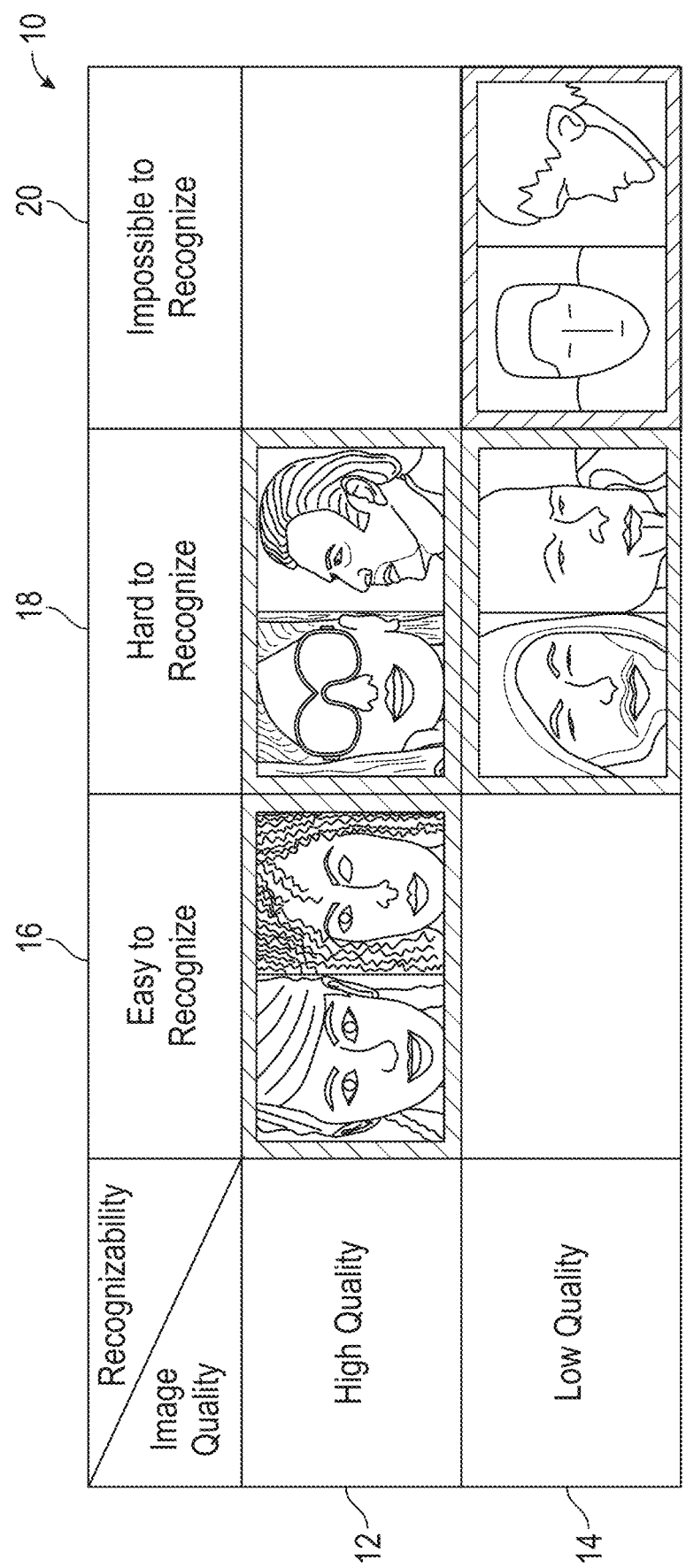
FIG. 1 is an example of a chart having facial images with different qualities and recognizabilities.

The following description is merely exemplary in nature and is not intended to limit the present disclosure, application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure. The teachings of the present disclosure may be implemented in a system for electronically communicating content to an end user or user device. Both the data source and the user device may be formed using a general computing device having a memory or other data storage for incoming and outgoing data. The memory may comprise but is not limited to a hard drive, FLASH, RAM, PROM, EEPROM, ROM phase-change memory or other discrete memory components.

Each general purpose computing device such as the controller may be implemented electronically in analog circuitry, digital circuitry or combinations thereof. Further, the computing device may include a microprocessor or microcontroller that is programmed to perform instructions (instruction signals) to carry out the steps performed by the various system components.

Motivated by the presence of unidentifiable facial images, a loss function is set forth that assigns different importance to samples of different difficulty according to the image quality. The system and method emphasizes hard samples for the high-quality images and easy samples for low quality images. Previously, assigning different importance to different difficulty of samples was done by looking at the training progression (curriculum learning). In the present disclosure the sample importance is adjusted by looking at the difficulty of the sample and its image quality. The reason why importance should be set differently according to the image quality is that naively emphasizing hard samples always puts a strong emphasis on unidentifiable images. This is because one can only make a random guess about unidentifiable images and thus they are always in the hard sample group.

There are challenges in introducing image quality into the objective. This is because image quality, £, is a term that is hard to quantify due to its broad definition and scaling samples based on the difficulty often introduces ad-hoc procedures that are heuristic in nature.

$$\mathcal{L} = -\log \frac{\exp(f(\theta_{yi}, m))}{\exp\left(f((\theta_{y_i}, m))\right) + \sum_{j \neq y_i}^{n} \exp(s \cos \theta_j)} \quad (1)$$

where $\theta_j$ is the angle between the feature vector and the $j^{th}$ classifier weight vector, $y_i$ is the index of the ground truth (GT) label, and m is the margin, which is a scalar hyper-parameter. $f$ is a margin function.

Figure 2A:
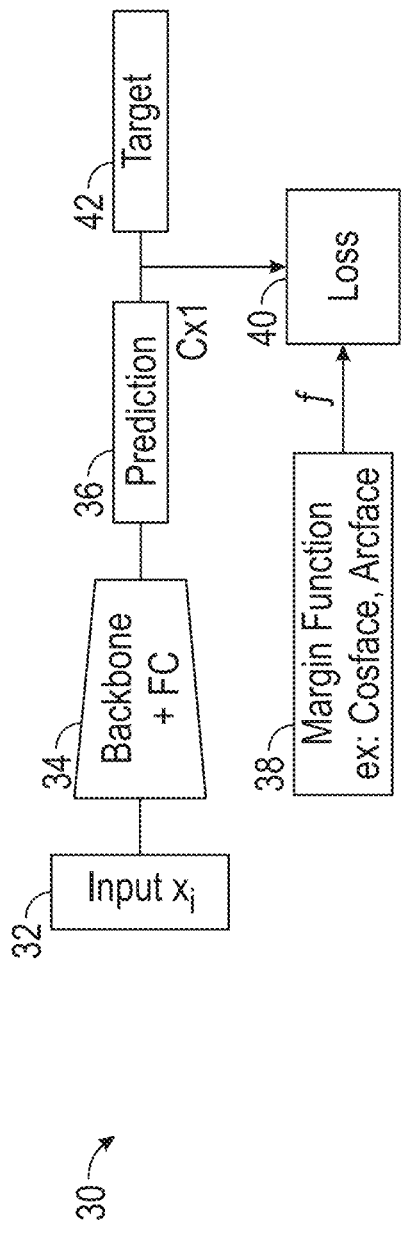
FIG. 2A is a training system for facial recognition according to the prior art.

Referring now to FIG. 2A, a conventional margin based SoftMax loss system 30 is illustrated. A training system for a prior art facial recognition system 30 is set forth to illustrate the differences with the present disclosure. In this example, an input 32 is used for inputting various images for training. A backbone and classifier 34 are used together with a fully connected layer (FC layer) that is used for feature extraction and classifying the input images. A prediction block 36 is used to predict the output. A margin function 38 communicates a fixed margin to the loss block 40. Based upon the margin function 38 and the output of the prediction 36, the correspondence of the prediction to the margin function determines the loss 40 which is used to adjust the weights at the backbone and classifier 34. Ultimately, a target 42 is identified. The target is the proper label for a particular person identified. That is, if the image of person A is being identified, label A is the target.

In the system 30, a facial recognition training pipeline with a margin based SoftMax loss. The loss function takes the margin function to induce smaller intra-class variations. Some examples are SphereFace, CosFace and ArcFace.

Figure 2B:
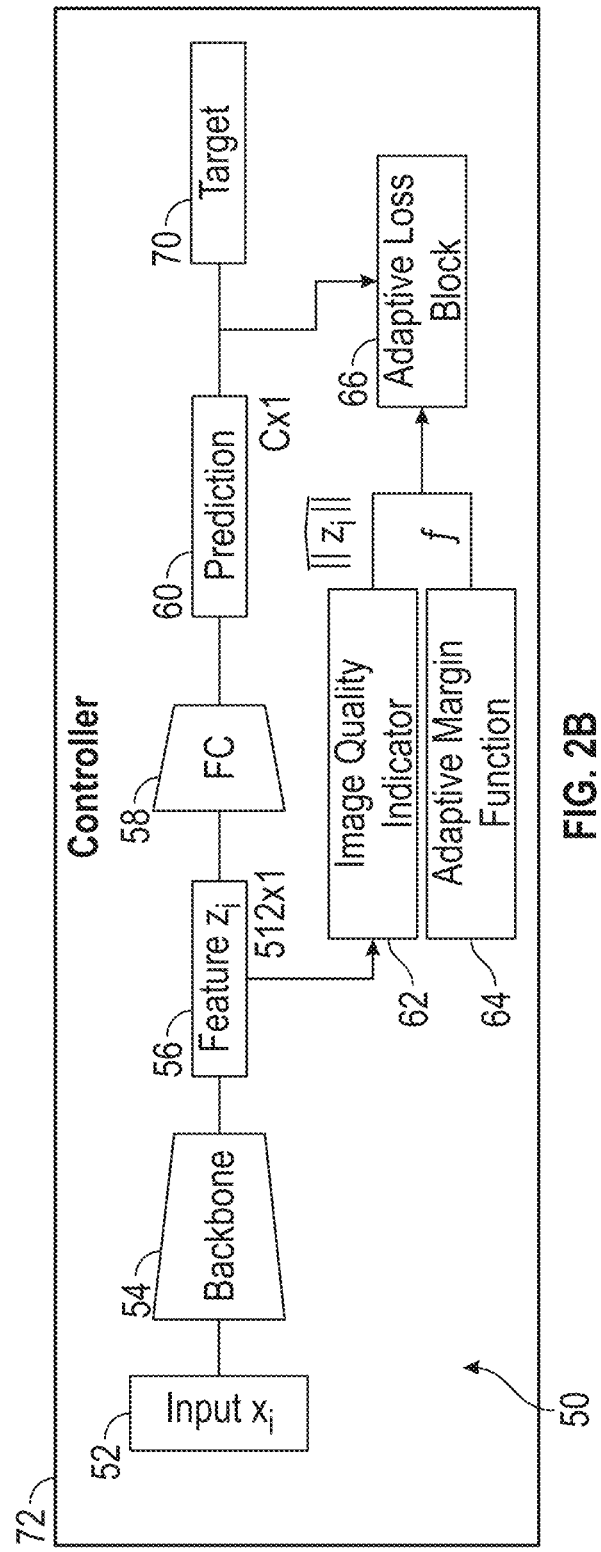
FIG. 2B is a controller for facial recognition according to the present disclosure.

Referring now to FIG. 2B, a system 50 according to the present disclosure is set forth. A system 50 has an input 52 that receives sample images. The sample images have a backbone 54 that processes the images as will be described in more detail below. Some preprocessing of images is used so that feature extraction in the feature extraction block 56 is performed more readily. Once the features are extracted, the classifier 58 classifies the images. The classifier 58 may be referred to as a fully connected layer classifier that connects neurons to the output and has weights therein. The classifications are communicated to a prediction block 60 that determines a prediction based upon the classification.

The features once extracted from feature block 56 are communicated to an image quality indicator block 62. The image quality indicator block 62 generates an image quality indicator corresponding to the quality of the indicator. As mentioned throughout this document, the image quality indicator may have a proxy, such as feature norm that is determined for each of the images. As described extensively, the feature norm may be used as a proxy for the image quality. An adaptive margin function block 64 generates an adaptive margin together with the image quality indicator are communicated to the adaptive loss block 66. Ultimately, the adaptive loss block 66 is used to generate updated weights or gradients that are fed back to the classifier 58 to adjust the classification. Blocks 52 through 70 may all be included within a controller 72. The controller 72 represents one or more microprocessors that are programmed to perform various functions and steps as described in further detail below.

The adaptive margin function block 64 has that is adjusted based on the image quality indicator, the loss function emphasis easy samples and identifiable hard samples.

The backbone 50 provides augmentation and optimization for the images. Examples of augmentation and optimization may include but are not limited to cropping, rescaling, and photometric jittering, scaling hue, saturation and brightness. Rescaling involves resizing an image to a smaller scale and back, resulting in blurriness. Augmentations may be used to prevent time delay in the system.

An adaptive margin function block 64 (AdaFace) is adjusted based on the image quality indicator. If the image quality is indicated to be low, the loss function emphasizes easy samples (thereby avoiding unidentifiable images). Otherwise, the loss emphasizes hard samples.

$$f(\theta_j, m)_{SphereFace} = \begin{cases} s \cos(m\theta_j) j = y_i \\ s \cos\theta_j j \neq y_i \end{cases} \quad (2)$$

$$f(\theta_j, m)_{CosFace} = \begin{cases} s(\cos\theta_j - m) j = y_i \\ s \cos\theta_j j \neq y_i \end{cases} \quad (3)$$

$$f(\theta_j, m)_{ArcFace} = \begin{cases} s \cos(\theta_j + m) j = y_i \\ s \cos\theta_j j \neq y_i \end{cases} \quad (4)$$

Ultimately a target is determined in block 70. The target is the label corresponding to the image as described above.

With respect to ArcFace, sometimes it is referred to as an angular margin and CosFace is referred to as an additive margin. Here, s is a hyperparameter for scaling. The present disclosure models the margin m as a function of the image quality because $f(\theta_y, m)$ has an impact on which samples contribute more gradient (i.e. learning signal) during training.

The output of the image quality indicator block 62 and the adaptive margin function block 64 is communicated to an adaptive loss block 66. Many studies have introduced an element of adaptiveness in the training objective for either hard sample mining, scheduling difficulty during training, or finding optimal hyperparameters. For example, CurricularFace brings the idea of curriculum learning into the loss function. During the initial stages of training, the margin for $\cos\theta_j$ (negative cosine similarity) is set to be small so that easy samples can be learned and in the later stages, the margin is increased so that hard samples are learned. Specifically, it is written as $$f(\theta_j, m)_{Curricular} = \begin{cases} s \cos(\theta_j + m) j = y_i \\ N(t, \cos\theta_j) j \neq y_i \end{cases}, \quad (5)$$

where $$N(t, \cos\theta_j) = \begin{cases} \cos(\theta_j) & s \cos(\theta_{y_i} + m) \geq \cos\theta_j \\ \cos(\theta_j)(t + \cos\theta_j) & s \cos(\theta_{y_i} + m) < \cos\theta_j \end{cases}, \quad (6)$$

and t is a parameter that increases as the training progresses. Therefore, in CurricularFace, the adaptiveness in the margin is based on the training progression (curriculum).

In the present disclosure, the adaptiveness in the margin is based on the image quality. Among high quality images, if a sample is hard (with respect to a model), the network should learn to exploit the information in the image, but in low quality images, if a sample is hard, it is more likely to be devoid of proper identity clues and the network should not try hard to fit on it.

MagFace explores the idea of applying different margins based on recognizability. It applies large angular margins to high norm features on the premise that high norm features are easily recognizable. Large margin pushes features of high norm closer to class centers. Yet, it fails to emphasize hard training samples, which is important for learning discriminative features. A detailed contrast with MagFace can be found below.

Figure 3:
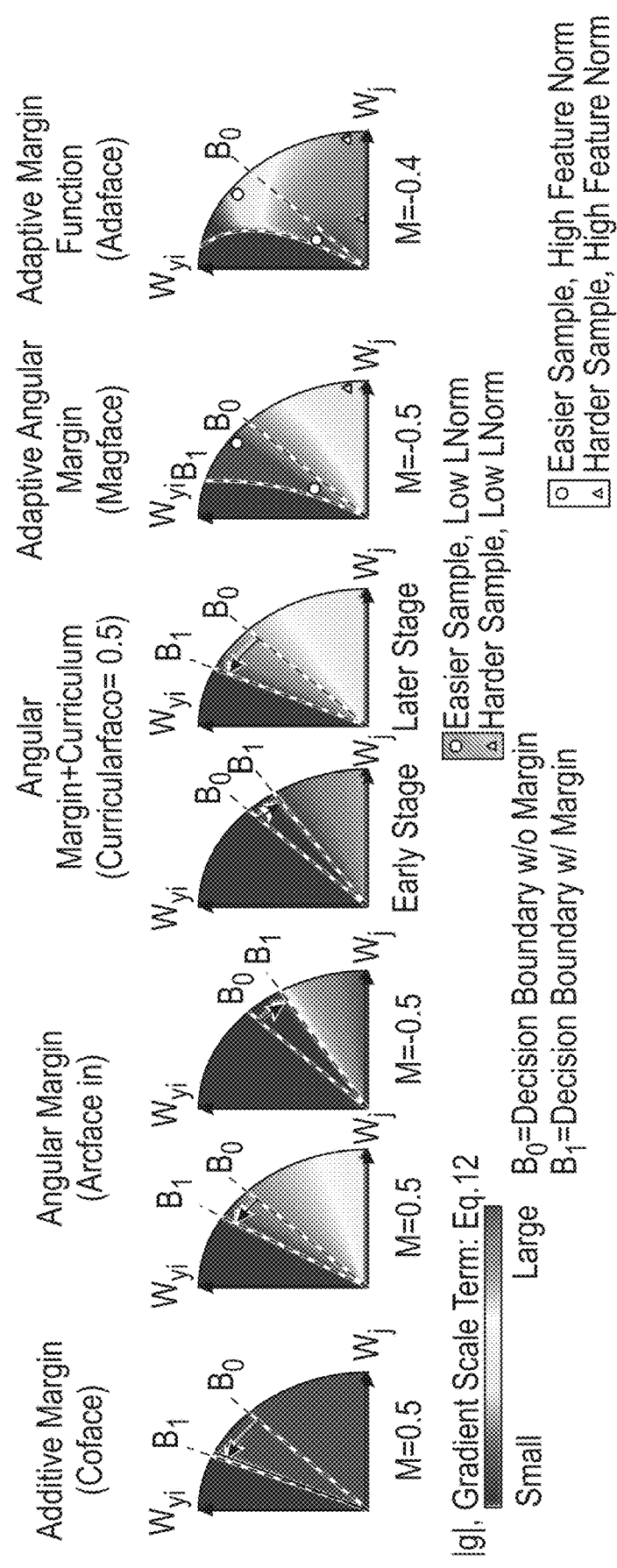
FIG. 3 is a plurality of different margin functions and their gradient scaling terms.

Referring now to FIG. 3, different margin functions and their gradient scaling terms on the feature space is set forth. B0 and B1 show the decision boundary with and without margin m, respectively. The arrow indicates the shift in the boundary due to margin m. In the arc, a well-classified sample will be close to (in angle) the ground truth class weight vector, Wyi. A misclassified sample will be close to Wj, the negative class weight vector. The shading within the arc indicates the magnitude of the gradient scaling term g shown at Equation 12 below. Samples in the dark red region will contribute more to learning. Note that additive margin shifts the boundary toward Wyi, without changing the gradient scaling term. However, positive angular margin not only shifts the boundary, but also makes the gradient scale high near the boundary and low away from the boundary. This behavior de-emphasizes very hard samples, and likewise MagFace has similar behavior. On the other hand, negative angular margin induces an opposite behavior. CurricularFace adapts the boundary based on the training stage. In the present disclosure, the system adaptively changes the margin functions based on the norm. With high norm, samples away from the boundary are emphasized and with low norm samples near the boundary are emphasized. Circles and triangles in the arc show example scenarios in the right most plots the two of which correspond to the present system (AdaFace).

Some sample systems include face recognition with low quality images. Recent facial recognition models have achieved high performance on datasets where facial attributes are discernable, e.g., LFW, CFP-FP, CPLFW, AgeDB and CALFW. Good performance on these datasets can be achieved when the facial recognition model learns discriminative features invariant to lighting, age or pose variations. However, facial recognition in unconstrained scenarios such as in surveillance or low quality videos have drawbacks. Examples of datasets in this setting are IJB-B, IJB-C and IJB-S, where most of the images are of low quality, and some do not contain sufficient identity information, even for human examiners. Good performance involves both learning discriminative features for low quality images and learning to discard images that contain few identity cues. The latter is sometimes referred to as quality aware fusion.

To perform quality aware fusion, probabilistic approaches have been proposed to predict uncertainty in facial recognition representation. It is assumed that the features are distributions where the variance can be used to calculate the certainty in prediction. However, due to the instability in the training objective, probabilistic approaches resort to learning mean and variance separately, which is not simple during training and suboptimal as the variance is optimized with a fixed mean. In the present disclosure, however, a modification to the conventional SoftMax loss is set forth, making the framework easy to use. Further, the feature norm is used as a proxy for the predicted quality during quality aware fusion.

Synthetic data or data augmentations can be used to mimic low quality data. Other systems adopt 3D face reconstruction to rotate faces and trains a facial attribute labeler to generate pseudo labels of training data. These auxiliary steps complicate the training procedure and make it hard to generalize to other datasets or domains. The present disclosure only involves simple crop, blur and photometric augmentations, which are also applicable to other datasets and domains.

Details of the present disclosure are set forth. The cross entropy SoftMax loss of a sample $x_i$ can be formulated as follows, $$\mathcal{L}_{CE}(x_i) = -\log \frac{\exp(W_{y_i} z_i + b_{y_i})}{\sum_{j=1}^{C} \exp(W_j z_j + b_j)}, \quad (7)$$

where $z_i \in \mathbb{R}^d$ is the $x_i$'s feature embedding, and $x_i$ belongs to the $y_i$th class. $W_j$ refers to the jth column of the last fully connected (FC) layer weight matrix, $W \in \mathbb{R}^{d \times c}$, and $b_j$ refers to the corresponding bias term. C refers to the number of classes.

During test time, for an arbitrary pair of images, $x_p$ and $x_q$, the cosine similarity metric, $$\frac{z_p \cdot z_q}{\|z_p\|\|z_q\|}$$

is used to find the closest matching identities. To make the training objective directly optimize the cosine distance, use normalized SoftMax where the bias term is set to zero and the feature $z_i$ is normalized and rescaled with s during training. This modification results in $$\mathcal{L}_{CE}(x_i) = -\log \frac{\exp(s \cdot \cos \theta_{y_i})}{\sum_{j=1}^{C} \exp(s \cos \theta_j)}, \quad (8)$$

where $\theta_j$ corresponds to the angle between $z_i$ and $W_j$. Follow-up works take this formulation and introduces a margin to reduce the intra-class variations. Generally, it can be written as Eq. 1 where margin functions are defined in Eqs. 2, 3 and 4 correspondingly.

Different margin functions in the present example can emphasize different difficulty of samples. Previous works on margin based SoftMax focused on how the margin shifts the decision boundaries and what their geometric interpretations are. The present disclosure shows during backpropagation, the gradient change due to the margin has the effect of scaling the importance of a sample relative to the others. In other words, angular margin can introduce an additional term in the gradient equation that scales the signal according to the sample's difficulty. To show this, how the gradient equation changes with the margin function $f(\theta_{y_i}, m)$ is observed.

Let $P_j^{(i)}$ be the probability output at class j after SoftMax operation on an input $x_i$. By deriving the gradient equations for $L_{CE}$ with respect to $W_j$ and $x_i$, the following are obtained:

$$P_j^{(i)} = \frac{\exp(f(\cos \theta_{y_i}))}{\exp(f(\cos \theta_{y_i})) + \sum_{j \neq y_i}^{n} \exp(s \cos \theta_j)}, \quad (9)$$

$$\frac{\partial \mathcal{L}_{CE}}{\partial W_j} = (P_j^{(i)} - \mathbb{1}(y_i = j)) \frac{\partial f(\cos \theta_j)}{\partial \cos \theta_j} \frac{\partial \cos \theta_j}{\partial W_j}, \quad (10)$$

$$\frac{\partial \mathcal{L}_{CE}}{\partial x_i} = \sum_{k=1}^{C} (P_k^{(i)} - \mathbb{1}(y_i = k)) \frac{\partial f(\cos \theta_k)}{\partial \cos \theta_k} \frac{\partial \cos \theta_k}{\partial x_i} \quad (11)$$

In Eqs. 10 and 11, the first two terms, $(P_j^{(i)} - \mathbb{1}(y_i = j))$ and $$\frac{\partial f(\cos \theta_j)}{\partial \cos \theta_j}$$

are scalars. Also, these two are the only terms affected by parameter m through $f(\cos \theta_{y_i})$. As the direction term, $$\frac{\partial \cos \theta_j}{\partial W_j}$$

is free of m, the first two scalar terms may be thought of as a gradient scaling term (GST) and denoted by, $$g := (P_j^{(i)} - \mathbb{1}(y_i = j)) \frac{\partial f(\cos \theta_j)}{\partial \cos \theta_j}. \quad (12)$$

For the purpose of the GST analysis, the class index $j=y_i$, is considered since all negative class indices $jl=y_i$ do not have a margin in Eqs. 2, 3, and 4. The GST for the normalized SoftMax loss is $$g_{softmax} = (P_{y_i}^{(i)} - 1)s, \quad (13)$$

since $f(\cos \theta_{y_i}) = s \cdot \cos \theta_{y_i}$ and $$\frac{\partial f(\cos\theta_{y_i})}{\partial \cos\theta_{y_i}} = s.$$

The GST for the CosFace is also $$g_{CosFace} = (P_{y_i}^{(i)} - 1)s, \qquad (14)$$

as $f(\cos\theta_{y_i}) = s(\cos\theta_{y_i} - m)$ and $$\frac{\partial f(\cos\theta_{y_i})}{\partial \cos\theta_{y_i}} = s.$$

Yet, the GST for ArcFace turns out to be $$g_{ArcFace} = (P_j^{(i)} - 1)s \left( \cos(m) + \frac{\cos\theta_{y_i} \sin(m)}{\sqrt{1 - \cos^2\theta_{y_i}}} \right). \qquad (15)$$

The derivation can be found in the supplementary. Since the GST is a function of $\theta_{y_i}$ and m as in Eq. 15, it is possible to use it to control the emphasis on samples based on the difficulty, i.e., $\theta_{y_i}$ during training.

To understand the effect of GST, GST is visualized with respect to the features. FIG. 3 shows the GST as the shading in the feature space. Note that for the angular margin, the GST peaks at the decision boundary but slowly decreases as it moves away towards $W_j$ and harder samples receive less emphasis. If the sign of the angular margin is changed, an opposite effect results. Note that, in the 6th column, MagFace is an extension of ArcFace (positive angular margin) with larger margin assigned to high norm feature. Both ArcFace and MagFace fail to put high emphasis on hard samples (area near $W_j$). All margin functions are combined (positive and negative angular margins and additive margins) to emphasize hard samples when necessary.

Note that this adaptiveness is also different from approaches that use the training stage to change the relative importance of different difficulty of samples. FIG. 3 shows CurricularFace where the decision boundary and the GST g change depending on the training stage.

Figure 4B:
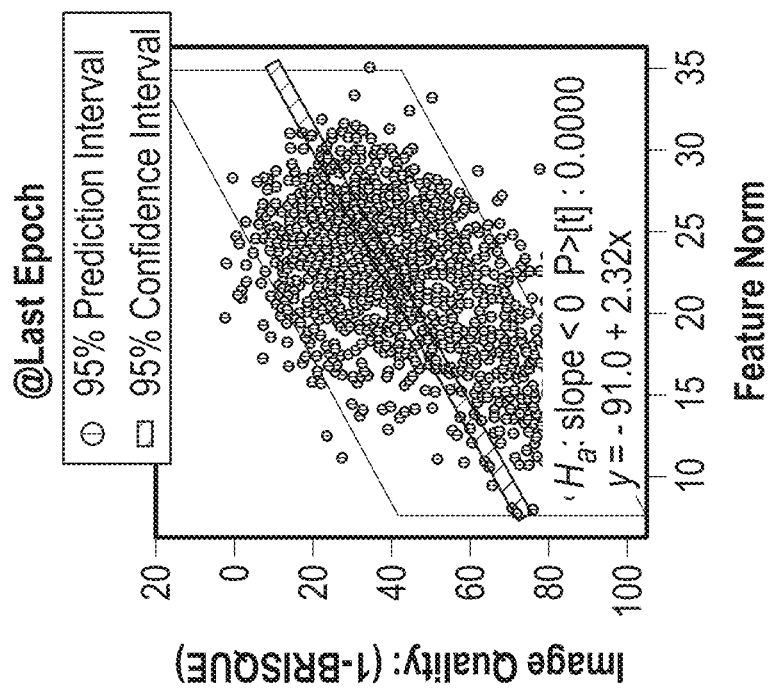
FIG. 4B is a plot of image quality versus feature norm.

Image quality is a comprehensive term that covers characteristics such as brightness, contrast and sharpness. Image quality assessment (IQA) is widely studied in computer vision. SER-FIQ is an unsupervised DL method for face IQA. BRISQUE is a popular algorithm for blind/no-reference IQA. However, such methods are computationally expensive to use during training. The feature norm is used as a proxy for the image quality. In models trained with a margin-based SoftMax loss, the feature norm exhibits a trend that is correlated with the image quality Referring now to FIG. 4A, a correlation plot between the feature norm and the image quality (IQ) score calculated with (1-BRISQUE) as the top line 410. 1,534 images were randomly sampled from the training dataset (MS1MV2) with augmentations described below. The feature norm using a pretrained model is determined. At the final epoch, the correlation score between the feature norm and IQ score reaches 0.5235 (out of −1 and 1). The corresponding scatter plot is shown in FIG. 4B. This high correlation between the feature norm and the IQ score supports the use of feature norm as the proxy of image quality.

Figure 4A:
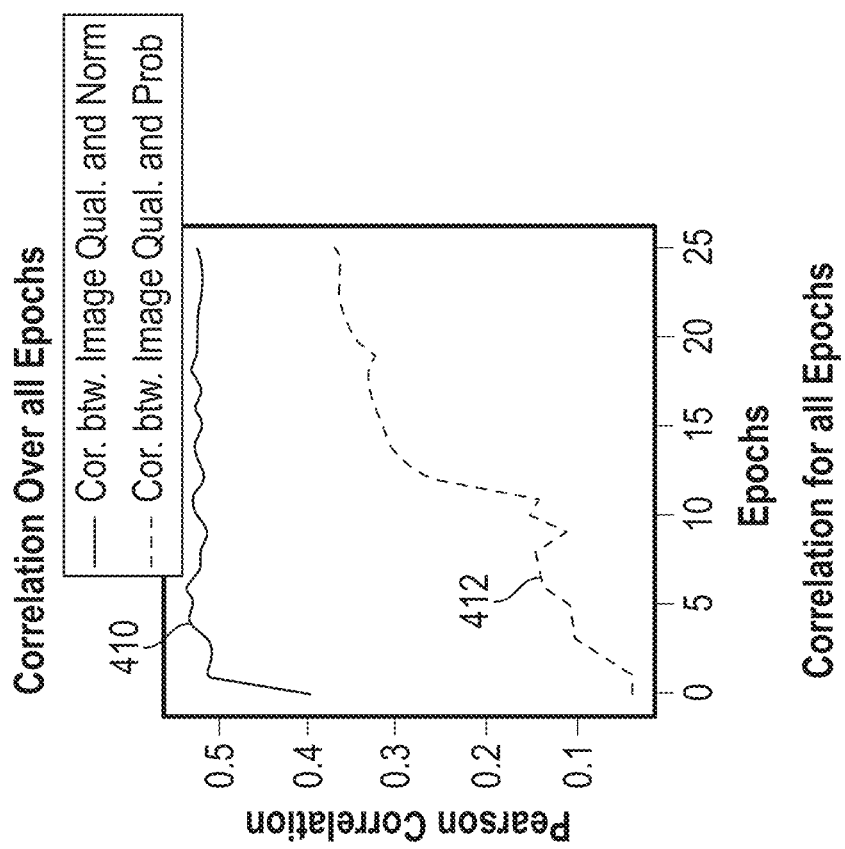
FIG. 4A is a plot of a Pearson correlation for all epochs.
Figure 4C:
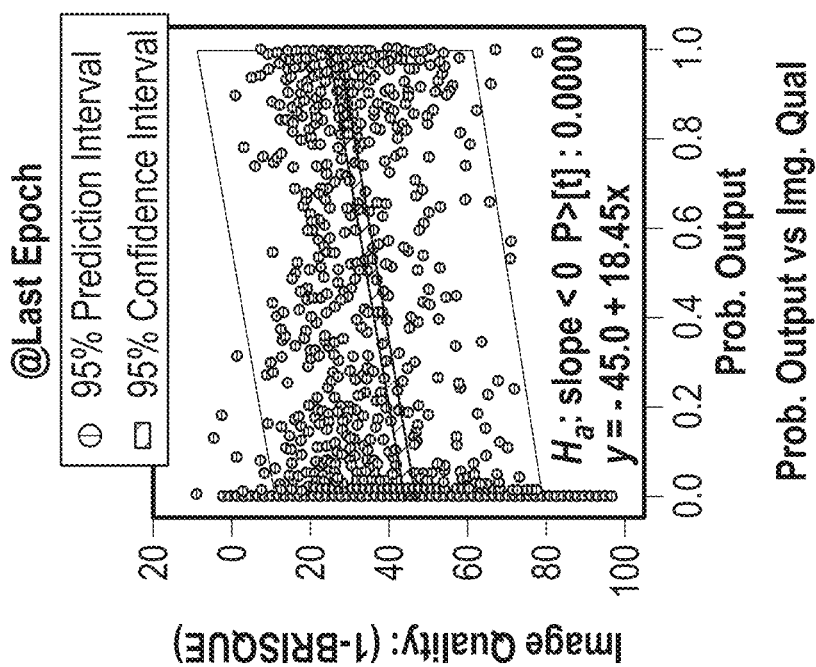
FIG. 4C is a plot of image quality versus probability output.

Referring now to FIGS. 4A-4C, correlations relative to the image quality to feature norm is shown. In FIG. 4A, a correlation plot is shown between the probability output $P_{y_i}$ and the IQ score as line 412. Note that the correlation is always higher for the feature norm than for $P_{y_i}$. Furthermore, the correlation between the feature norm and image quality score in FIG. 4B is visible from an early stage of training. This is a useful property for using the feature norm as the proxy of image quality because the proxy from the early stage of training can be relied upon. Also, in FIG. 4C, a scatter plot between $P_{y_i}$ and IQ score is shown. Notice that there is a non-linear relationship between $P_{y_i}$ and the image quality. One way to describe a sample's difficulty is with $1-P_{y_i}$, and the plot shows that the distribution of the difficulty of samples is different based on image quality. Therefore, it makes sense to consider the image quality when adjusting the sample importance according to the difficulty.

To address the problem caused by the unidentifiable images, the margin function is adapted based on the feature norm. Using different margin functions can emphasize different difficulty of samples. The feature norm can be a good way to find low quality images. The two findings are used and a new loss for facial recognition is generated.

For the image quality indicator, the following is provided. As the feature norm, $\|z_i\|$ is a model dependent quantity, using batch statistics $\mu_z$ and $\sigma_z$, it is normalized. Specifically, $$\|\hat{z}_i\| = \left\lfloor \frac{\|z_i\| - \mu_z}{\sigma_z/h} \right\rfloor_{-1}^{1}, \qquad (16)$$

where $\mu_z$ and $\sigma_z$ are the mean and standard deviation of all $\|z_i\|$ within a batch. And $\lfloor \cdot \rceil$ refers to clipping the normalized feature norm value between −1 and 1 and stopping the gradient from flowing. Since $$\frac{\|z_i\| - \mu_z}{\sigma_z/h}$$

makes the batch distribution of $\|\hat{z}_i\|$ as approximately unit Gaussian, clipping the value of the normalized feature norm is clipped to be within −1 and 1 for better handling. It is known that approximately 68% of the unit Gaussian distribution falls between −1 and 1, so the term h is introduced to control the concentration. h is set such that most of the values $$\frac{\|z_i\| - \mu_z}{\sigma_z/h}$$

fall between −1 and 1. A good value to achieve this would be h=0.33. The gradient is stopped from flowing during backpropagation because features are not wanted to be optimized to have low norms.

If the batch size is small, the batch statistics $\mu_z$ and $\sigma_z$ can be unstable. Thus, the exponential moving average (EMA) of $\mu_z$ and $\sigma_z$ is used across multiple steps to stabilize the batch statistics. Specifically, let $\mu^{(k)}$ and $\sigma^{(k)}$ be the k-th step batch statistics of $\|z_i\|$. Then $$\mu_z = \alpha \mu_z^{(k)} + (1-\alpha)\mu_z^{(k-1)}, \qquad (17)$$

and $\alpha$ is a momentum set to 0.99. The same is true for $\sigma_z$.

For the adaptive margin function, a margin function is used such that if image quality is high, hard samples are emphasized, and if image quality is low, hard samples are de-emphasized. This is achieved with two adaptive terms $g_{angle}$ and $g_{add}$, referring to angular and additive margins, respectively. Specifically, let $$f(\theta_j, m)_{AdaFace} = \begin{cases} s\cos(\theta_j + g_{angle}) - g_{add} & j = y_i \\ s\cos\theta_j & j \neq y_i \end{cases}, \quad (18)$$

where $g_{angle}$ and $g_{add}$ are the functions of $\|\mathbf{z}_i\|$ which are defined as:

$$g_{angle} = -m \cdot \|\widehat{z}_i\|, g_{add} = m \cdot \|\widehat{z}_i\| + m. \quad (19)$$

Note that when $\|\widehat{z}_i\| = -1$, the proposed function becomes ArcFace. When $\|\widehat{z}_i\| = 0$, it becomes CosFace. When $\|\widehat{z}_i\| = 1$, it becomes a negative angular margin with a shift. FIG. 3 shows the effect of the adaptive function on the gradient. The high norm features will receive a higher gradient scale, far away from the decision boundary, whereas the low norm features will receive higher gradient scale near the decision boundary. For low norm features, the harder samples away from the boundary are de-emphasized.

Figure 5A:
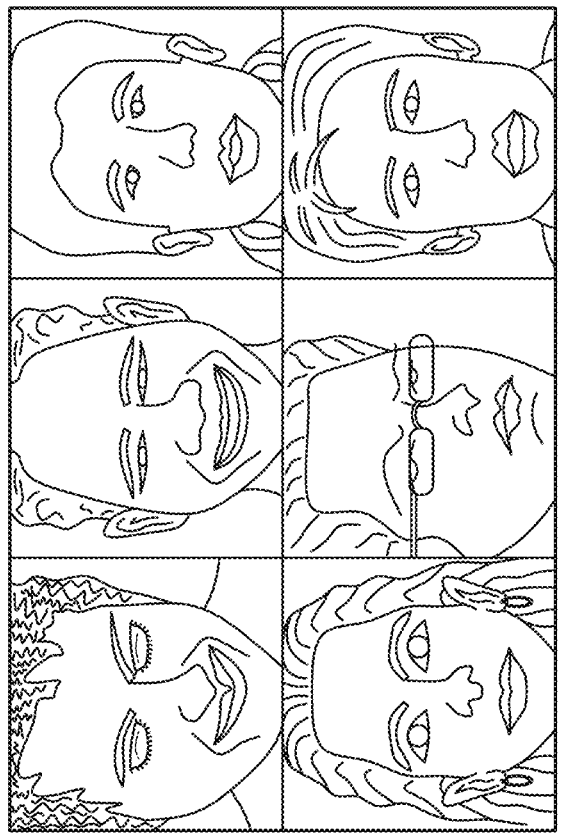
FIG. 5A is a plurality of high-quality images.
Figure 5C:
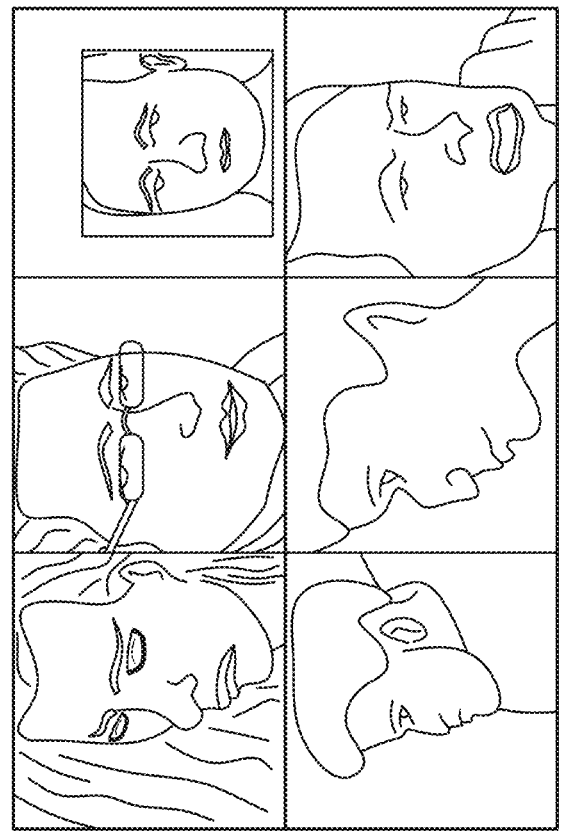
FIG. 5C is a plurality of low-quality images.
Figure 5B:
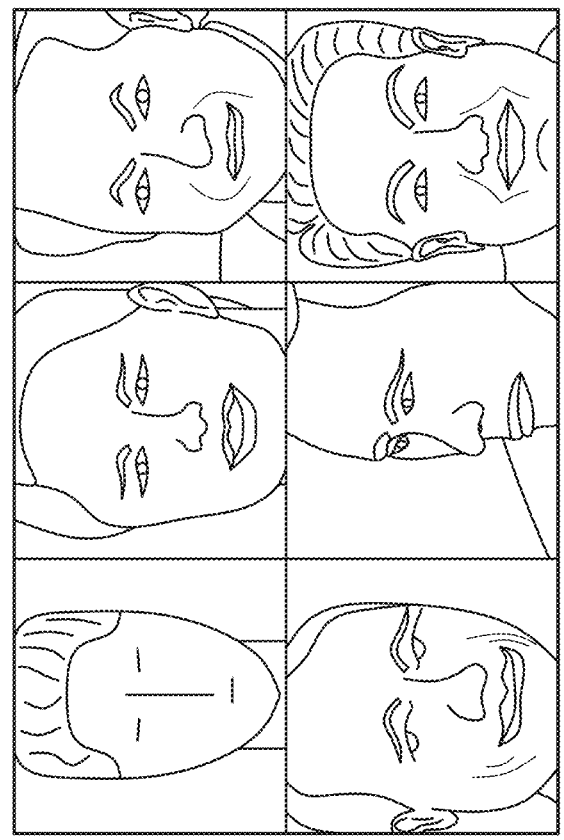
FIG. 5B is a plurality of mixed quality images.
Figure 5D:
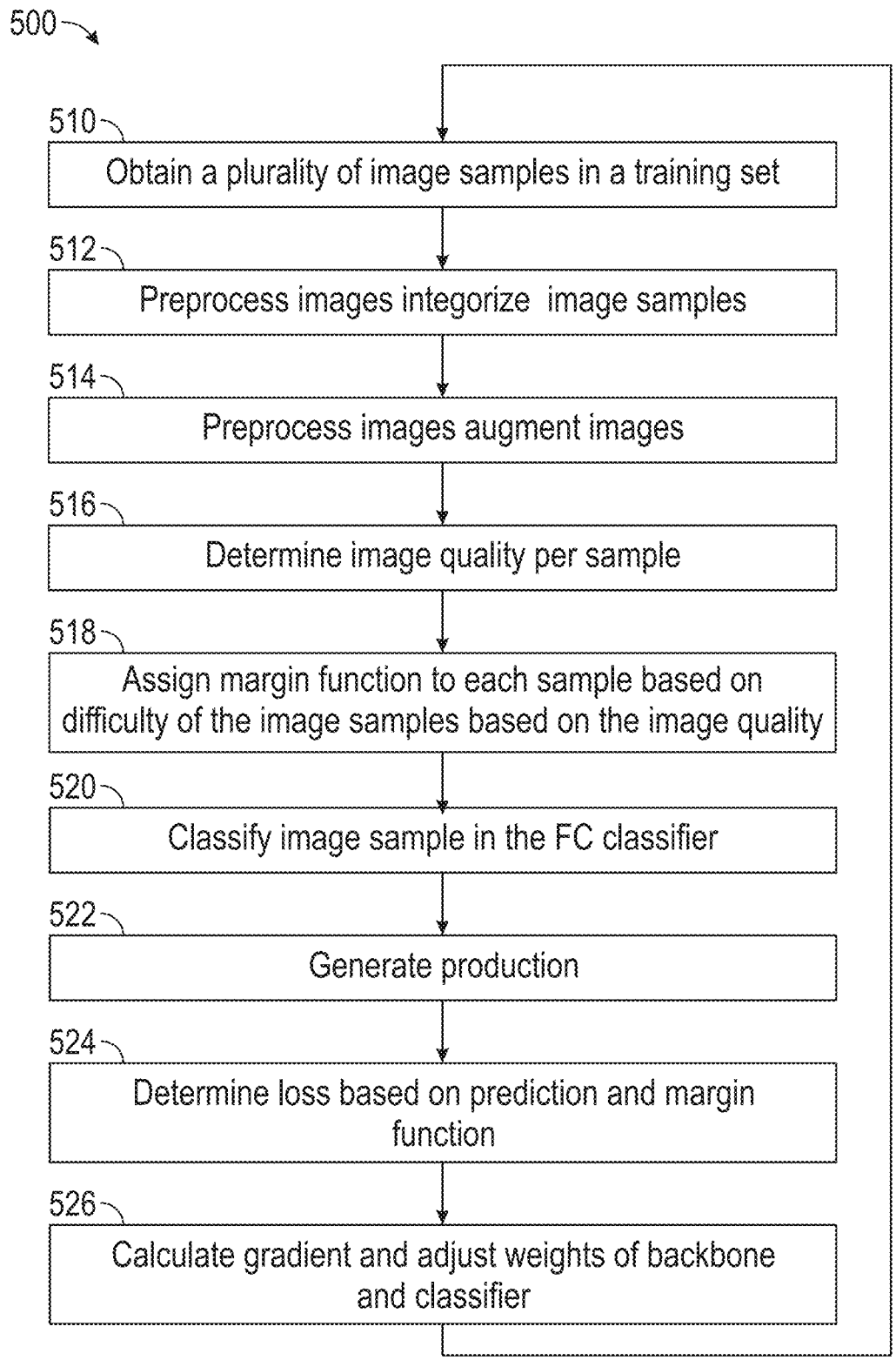
FIG. 5D is a flowchart of a method for operating the system.

Referring now to FIG. 5B, in step 510 training sets were obtained. During one example, testing using MS1MV2, MS1MV3 and WebFace4M were used as the training datasets. Each dataset contains 5.8M, 5.1M and 4.2M facial images, respectively. Nine datasets of varying qualities were tested. The images of the test datasets were categorized into three types according to the visual quality in step 512 as set forth by Yichun Shi, Xiang Yu, Kihyuk Sohn, Manmohan Chandraker, and Anil K Jain, Towards universal representation learning for deep face recognition. In Proceedings of the IEEE/CVF Conference on Computer Vision and Pattern Recognition, pages 6817-6826, 2020, which are hereby incorporated by reference.

High Quality: LFW, CFP-FP, CPLFW AgeDB and CALFW are popular benchmarks for facial recognition in the well-controlled setting. While the images show variations in lighting, pose, or age, they are of sufficiently good quality for face recognition.

Mixed Quality: IJB-B and IJB-C are datasets collected for the purpose of introducing low quality images in the validation protocol. They contain both high quality images and low quality videos of celebrities.

Low Quality: IJB-S and TinyFace are datasets with low quality images and/or videos. IJB-S is a surveillance video dataset, with test protocols such as Surveillance-to-Single, Surveillance-to-Booking and Surveillance-to-Surveillance. The first/second word in the protocol refers to the probe/gallery image source. Surveillance refers to the surveillance video, Single refers to a high quality enrollment image and Booking refers to multiple enrollment images taken from different viewpoints. TinyFace consists only of low-quality images.

In step 514, training images are preprocessed by, for example, cropping and aligning faces with five landmarks, resulting in 112×112 images. For the backbone, ResNet was modified as set forth by Jiankang Deng, Jia Guo, Niannan Xue, and Stefanos Zafeiriou. ArcFace: Additive angular margin loss for deep face recognition. In *Proceedings of the IEEE/CVF Conference on Computer Vision and Pattern Recognition*, pages 4690-4699, 2019. 1, 2, 3, 4, 5, 7, the disclosure of which is incorporated by reference herein.

The backbone and classifier are trained by the optimizer for 24 epochs, in this example. The learning rate is one configuration of the optimizer The model is trained with Stochastic Gradient Descent (SGD) with the initial learning rate of 0.1 and step scheduling at 10, 18 and 22 epochs. If the dataset contains augmentations, two more epochs may be added for convergence. A scale parameter s is set it to 64 in this example.

Since the present method is designed to train better in the presence of unidentifiable images in the training data, three on-the-fly augmentations that are widely used in image classification tasks in step 514, i.e., cropping, rescaling and photometric jittering. The augmentations create more data but also introduce more unidentifiable images. It is a trade-off that is to be balanced. Oftentimes in facial recognition, the augmentations are not used because they generally do not bring benefit to the performance. The present loss function is capable of benefitting from augmentations because it can adapt to ignore unidentifiable images.

Cropping defines a random rectangular area (patch) and makes the region outside the area to be 0. The image is not cut and resized as the alignment of the face is important. Photometric augmentation randomly scales hue, saturation and brightness. Rescaling involves resizing an image to a smaller scale and back, resulting in blurriness. These operations are applied randomly with a probability of 0.2.

For hyperparameter m and h ablation, ResNet18 backbone is adopted and used ⅙th of the randomly sampled MS1MV2. Two performance metrics are used. For High Quality Datasets (HQ), an average of 1:1 verification accuracy is used in LFW, CFP-FP, CPLFW, AgeDB and CALFW. For Low Quality Datasets (LQ), an average of the closed-set rank-1 retrieval and the open-set TPIR@FIPR=1% for all 3 protocols of IJB-S is used. Unless otherwise stated, the data is augments as described above.

Effect of Image Quality Indicator Concentration h. h=0.33 is described as a good value. To validate this claim, the performance when varying h is shown. When h=0.33, the model performs the best. For h=0.22 or h=0.66, the performance is still higher than CurricularFace. As long as h is set such that $\|\widehat{z}_i\|$ has some variation, h is not very sensitive. h=0.33 is used.

In FIG. 5E, ablation of our margin function parameters h and m, and the image quality proxy choice on the ResNet18 backbone. The performance metrics are described above.

The effect of hyperparameter margin m corresponds to both the maximum range of the angular margin and the magnitude of the additive margin. FIG. 5E shows that the performance is best for HQ datasets when m=0.4 and for LQ datasets when m=0.75. Large m results in large angular margin variation based on the image quality, resulting in more adaptivity. In subsequent data processing m=0.4 since was performed and it achieves good performance for low quality datasets without sacrificing performance on HQ datasets.

In step 516 the image quality of all of the samples is determined as mentioned in detail above. A proxy for the image quality may be used. In FIG. 5E, to show the effectiveness of using the feature norm as a proxy for image quality, the feature norm with other quantities such as (1−BRISQUE) or Pyi. The performance using the feature norm is superior to using others. The BRISQUE score is pre-computed for the training dataset, so it is not as effective in capturing the image quality when training with augmentation. Pyi is included to show that the adaptiveness in feature norm is different from adaptiveness in difficulty.

As mentioned above relative to step 514, on-the-fly augmentations in our training data is performed. The present loss function can effectively handle the unidentifiable images, which are generated occasionally during augmentations. Experiments with a larger model ResNet50 on the full MS1MV2 dataset were performed in FIG. 5F with ablation of augmentation probability p, on the ResNet50 backbone. The metrics are the same as FIG. 5E.

FIG. 5F shows that indeed the augmentation brings performance gains for AdaFace. The performance on HQ datasets stays the same, whereas LQ datasets enjoy a significant performance gain. Note that the augmentation hurts the performance of CurricularFace, which is in line with our assumption that augmentation is a tradeoff between a positive effect from getting more data and a negative effect from unidentifiable images. Prior works on margin-based SoftMax do not include on-the-fly augmentations as the performance could be worse. AdaFace avoids overfitting on unidentifiable images, therefore it can exploit the augmentation better.

A margin function is assigned to each sample based on the image quality in step 518. In step 520, the image samples are classified in the classifier 58. A prediction is generated in step 522. In step 524, the loss is determined based upon the prediction and the margin function. Ultimately, in step 526, gradients are calculated and the weights are adjusted in the backbone and classifier as mentioned above. This is referred to as back-propagation. Training may then be repeated starting back at step 510.

Figure 6:
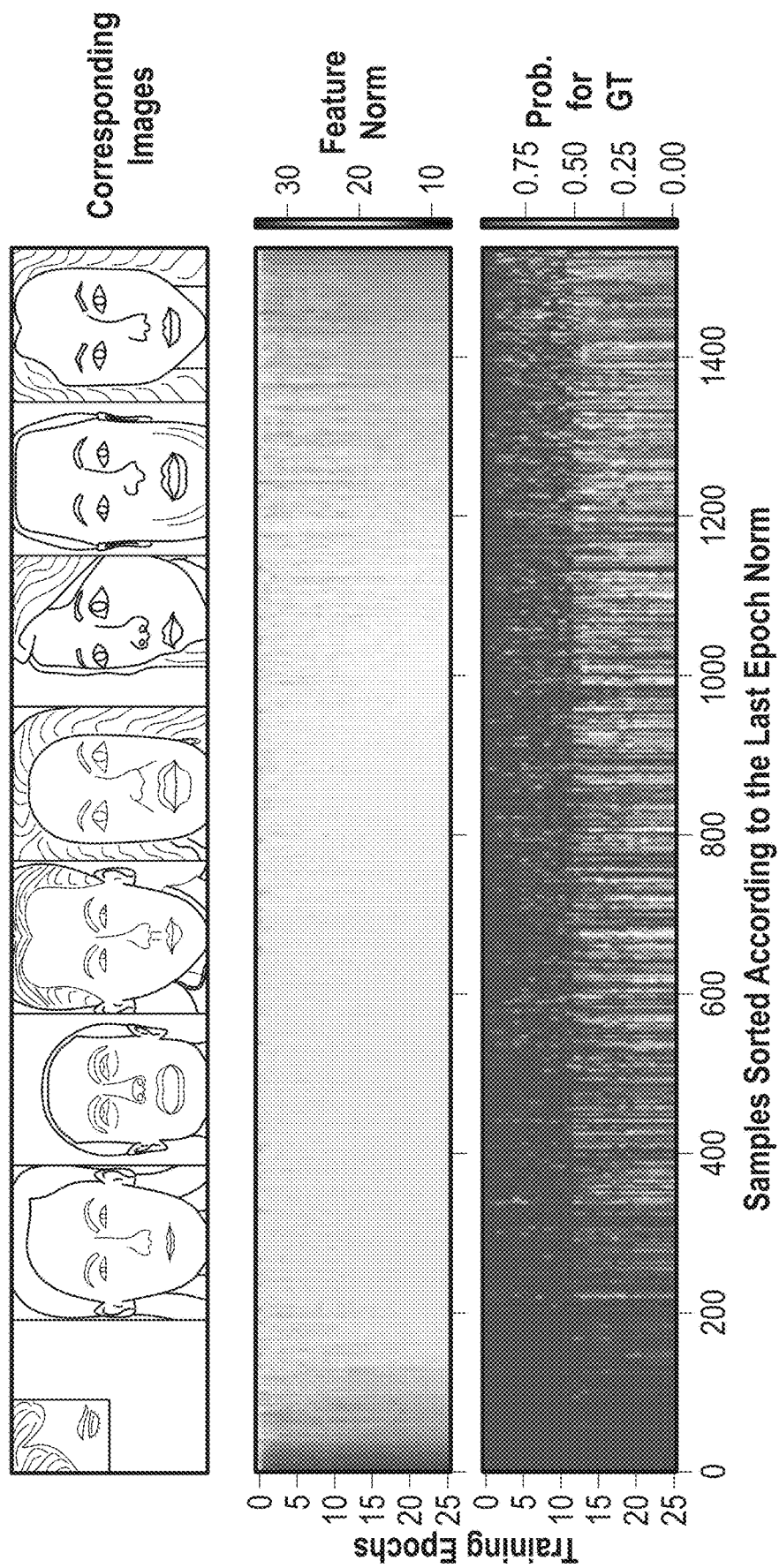
FIG. 6 is a plot of feature norms and probabilities for various training epochs sorted according to the last epic norm.

Referring now to FIG. 6, a plot of training samples' trajectories of feature norm $\|zi\|$ and the probability output for the ground truth index Pyi. 1,536 samples were randomly selected from the training data with augmentations, and show eight images evenly sampled from them. The features with low norm have a different probability trajectory than others and the corresponding images are hard to identify. to show how the feature norm $\|z_i\|$ and the difficulty of training samples change during training, the sample trajectory is plotted in FIG. 6. A total of 1,536 samples are randomly sampled from the training data. Each column in the heatmap represents a sample, and the x-axis is sorted according to the norm of the last epoch. Sample #600 is approximately a middle point of the transition from low to high norm samples. The bottom plot shows that many of the probability trajectories of low norm samples never get high probability till the end. It is in line with our claim that low norm features are more likely to be unidentifiable images. It justifies our motivation to put less emphasis on these cases, although they are "hard" cases. The percentage of samples with augmentations is higher for the low norm features than for the high norm features. For samples number #0 to #600, about 62.0% are with at least one type of augmentation. For the samples #600 or higher, the percentage is about 38.5%.

Compared to classic margin-based loss functions, our method adds a negligible amount of computation in training. With the same setting, ArcFace takes 0.3193 s per iteration while AdaFace takes 0.3229 s (+1%). Finish out method The gradient or gradient scaling term of step 530 is described in further detail. The gradient scaling term (GST), g is introduced. Specifically, it is derived from the gradient equation for the margin-based SoftMax loss and defined as $$g := \left(P_j^{(i)} - \mathbb{1}(y_i = j)\right)\frac{\partial f(\cos\theta_j)}{\partial \cos\theta_j} \quad (20)$$

where $$P_j^{(i)} = \frac{\exp\left(f(\cos\theta_{y_i})\right)}{\exp\left(f(\cos\theta_{y_i})\right) + \sum_{j\neq y_i}^{n} \exp\left(s\cos\theta_j\right)}. \quad (21)$$

This scalar term, g affects the magnitude of the gradient during backpropagation from the margin-based SoftMax loss. The form of g depends on the form of the margin function $f(\cos\theta_j)$. In FIG. 7, the margin function $f(\cos\theta_j)$ and the corresponding GST when $j=y_i$, the ground truth index is set forth. The adaptive angular margin is explored in MagFace. However, unlike other works, MagFace is treats $m(\|z_i\|)$ as a term to optimize (i.e., $\|z_i\|$ is a function of $\cos\theta_j$), as opposed to treating it as a constant. In this table, $\|z_i\|$ is treated as a constant to highlight the effect of the margin. The exact form of g for MagFace will be different. In FIG. 3 above, adaptive angular margin is visualized using the equation from this table.

Note that $P_{y_i}$ is also affected by the choice of the margin function $f(\cos\theta_{y_i})$ as in Eqn. 21. So, g is a function of m, except for SoftMax, and g is affected by m through $f(\cos\theta_{y_i})$ in $P_{y_i}$. For Angular Margin, m appears in the equation for g directly. The variable g for the adaptive angular margin below is derived. The term g for the Adaptive Angular Margin and CurricularFace can be obtained using the g from the Angular Margin. The GST term for AdaFace can be obtained by using g for the Angular Margin and the Additive Margin, and replacing m with adaptive terms $g_{angle}$ and $g_{add}$. This is possible because $\|z_i\|$ is treated as a constant.

In the following, the derivation of angular margin is set forth. $f(\cos\theta_{y_i})$ can be rewritten as $$\begin{aligned}f(\cos\theta_{y_i}) &= s\cdot\left(\cos\left(\theta_{y_i}+m\right)\right) \\ &= s\cdot\left(\cos\theta_{y_i}\cos m - \sin\theta_{y_i}\sin m\right) \\ &= s\cdot\left(\cos\theta_{y_i}\cos m - \sqrt{1-\cos^2\theta_{y_i}}\,\sin m\right)\end{aligned} \quad (22)$$

by the laws of trigonometry. Therefore, $$\frac{\partial f(\cos\theta_{y_i})}{\partial \cos\theta_{y_i}} = s\left(\cos(m) + \frac{\cos\theta_{y_i}\sin(m)}{\sqrt{1-\cos^2\theta_{y_i}}}\right). \quad (23)$$

Figure 8:
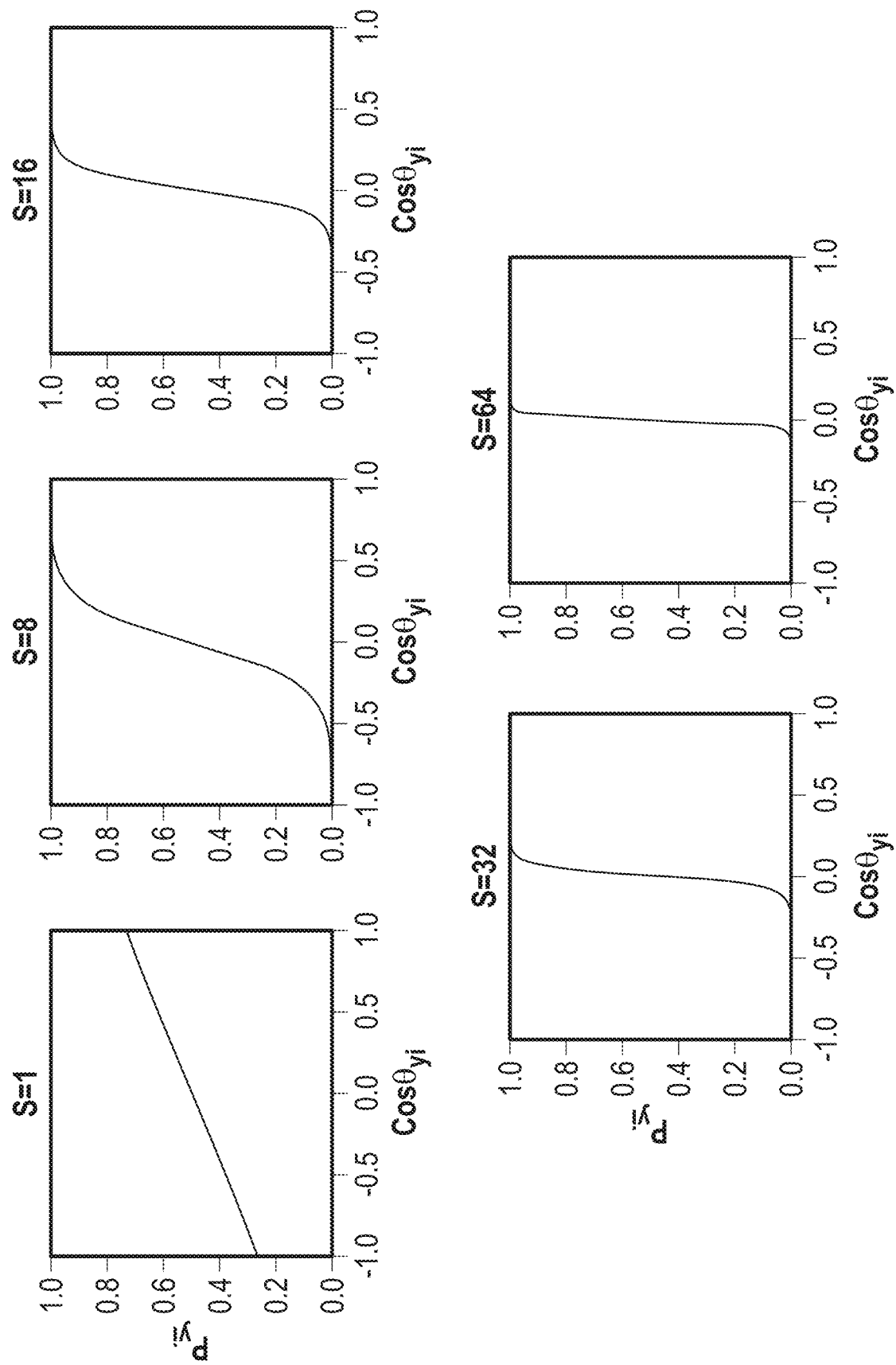
FIG. 8 are plots of $P_{yi}$ for different values of S calculated from SoftMax.

The value g may be interpreted. For SoftMax and Additive Margin, $g=(P_{y_1}^{(i)}-1)s$. Since the SoftMax operation in $P_{y_1}^{(i)}$ has a tendency to scale the result to be close to either 0 or 1, the first term in g, $(P_j^{(i)}-1)$ tends to be close to 1 or 0 far away from the decision boundary. In the equation for $P_{y_i}$, there is also s which is a scaling hyper-parameter, and is often set to s=64. This high s makes the SoftMax operation even steeper near the decision boundary. This results in almost equal GST for samples away from the decision boundary, regardless of how far they are from the decision boundary. This is evident in FIG. 8, where the curve is flat except near the decision boundary when s is high. In FIG. 8, a plot of $P_{y_i}$ for different values of s is set forth. In this figure, $P_{y_i}$ is calculated with $f(\cos\theta j)$ from SoftMax (i.e. m=0). For SoftMax and Additive Margin, $$\frac{\partial f(\cos\theta_{y_i})}{\partial \cos\theta_{y_i}} = s.$$

Figure 9:
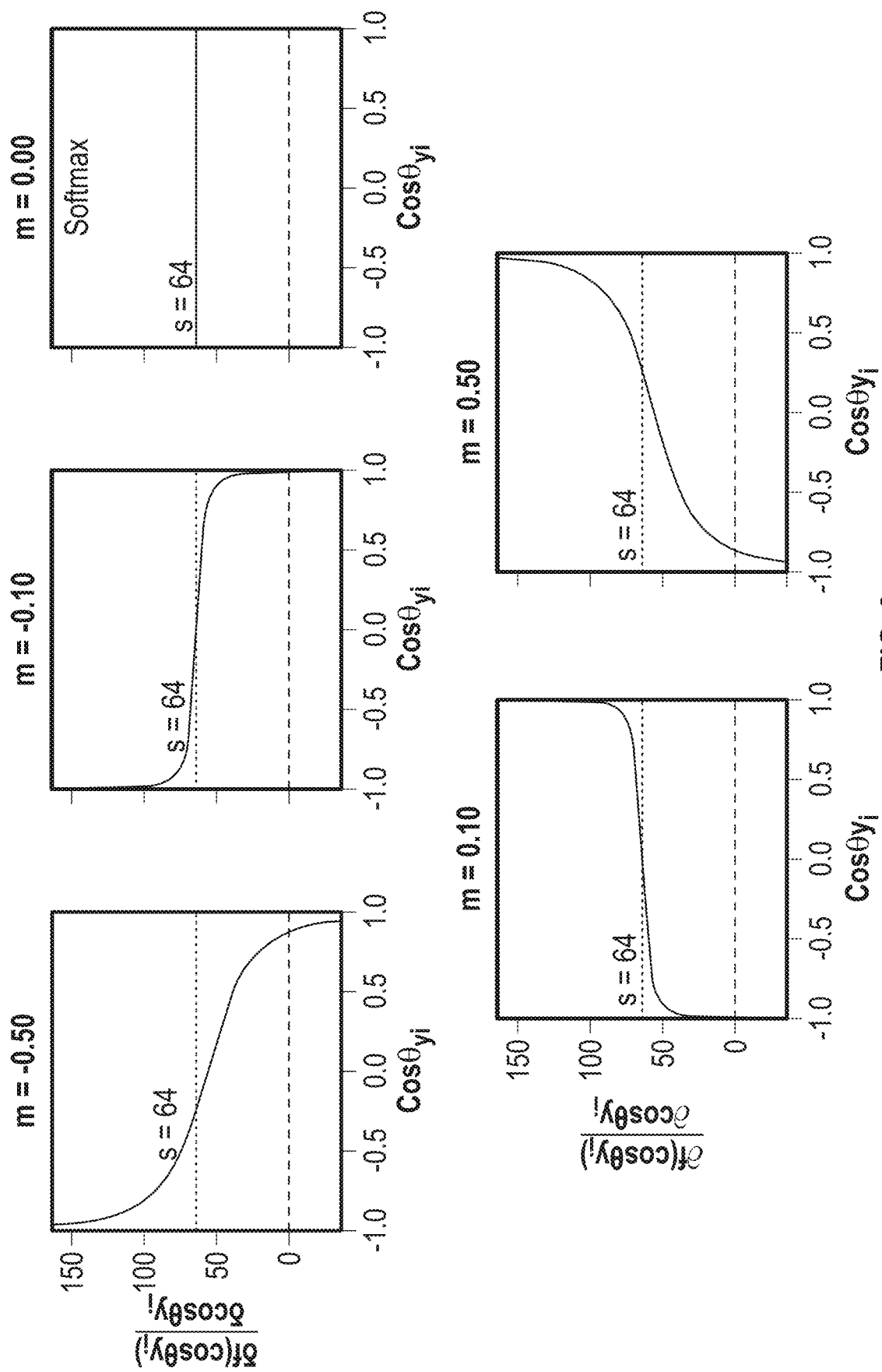
FIG. 9 is a plot of ratios for different values of M when the margin function is an angular margin.

This term is different for Angular Margin due to $$\frac{\partial f(\cos\theta_{y_i})}{\partial \cos\theta_{y_i}}$$

being a function of cos $\theta_{y_i}$. The exact form of $$\frac{\partial f(\cos\theta_{y_i})}{\partial \cos\theta_{y_i}}$$

for Angular Margin is found in Eqn. 23. As shown in FIG. 9, Eqn. 23 is monotonically increasing with respect to cos $\theta_{y_i}$ when m>0 and vice versa. Note that cos $\theta_{y_i}$ is how close the sample is to the ground truth weight vector, and it is closely related to the difficulty of the sample during training. Therefore, this partial derivative term from the angular margin, $$\frac{\partial f(\cos\theta_{y_i})}{\partial \cos\theta_{y_i}},$$

can be viewed as scaling the importance of sample based on the difficulty. FIG. 9 is a plot of different values of m when the margin function is an angular margin.

Figure 10A:
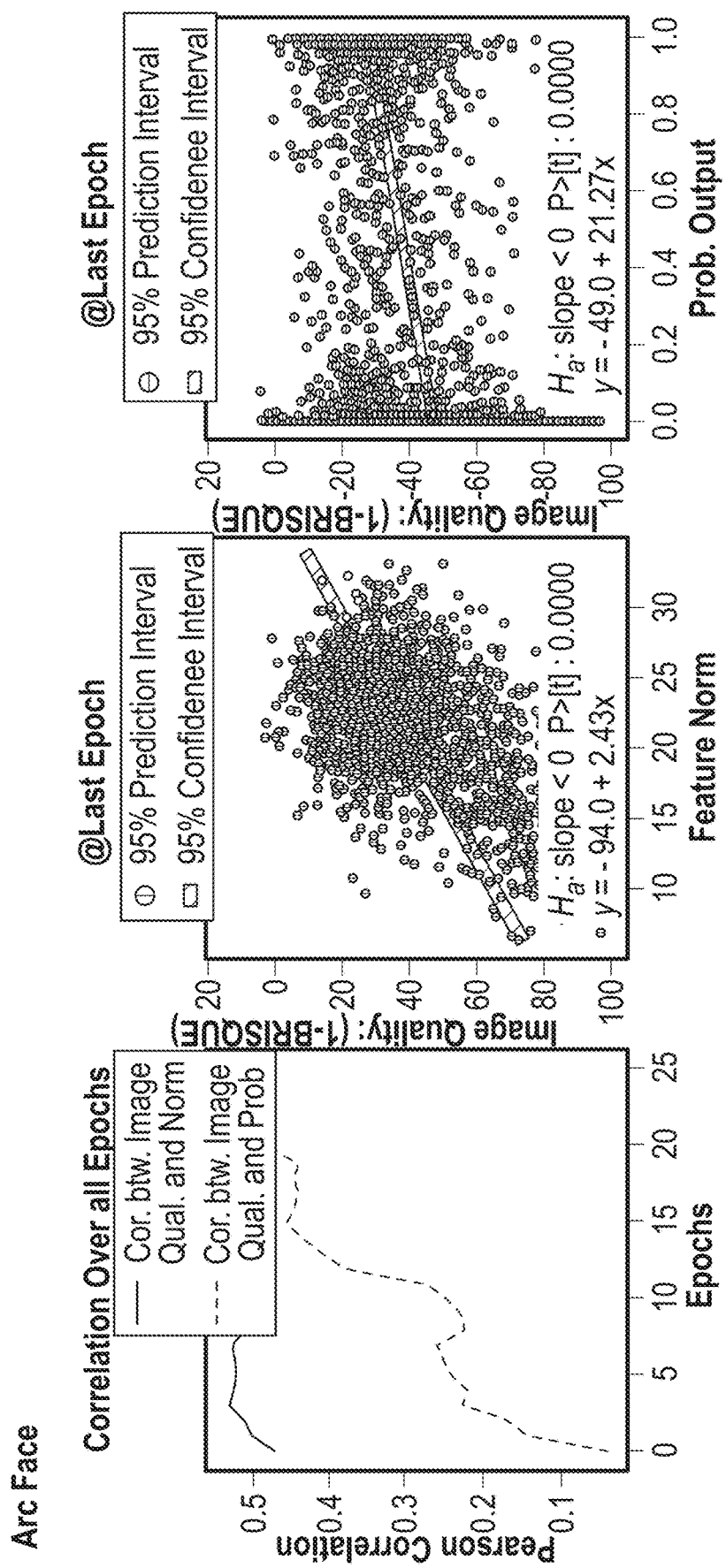
FIG. 10A are plots of epochs, feature norms and probability outputs for ArcFace versus FIG. 10B are plots of epochs, feature norms and probability outputs for AdaFace.
Figure 10B:
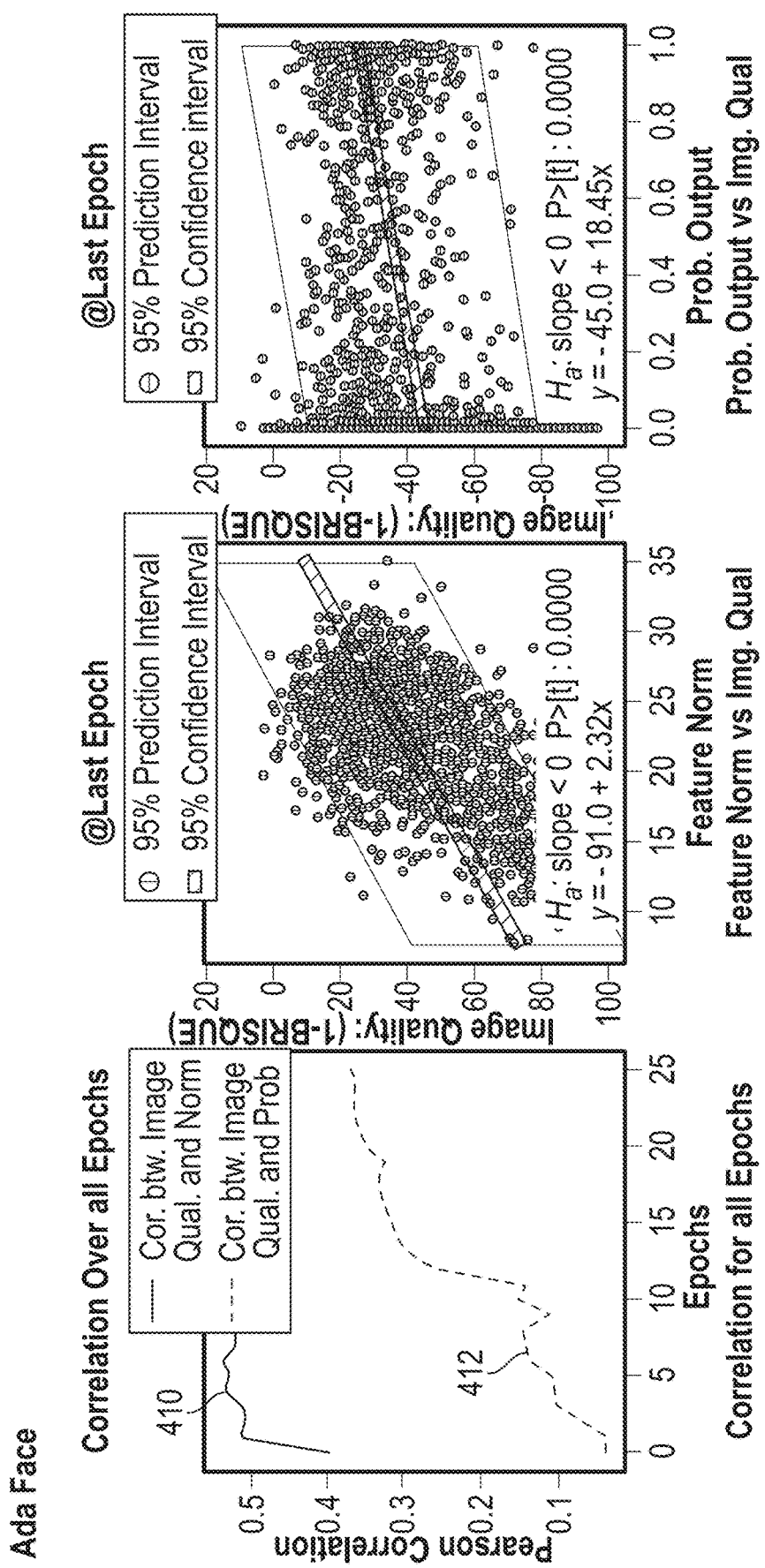

A correlation between feature norm and brisque during training is set forth. The idea of using the feature norm as a proxy of the image quality is set forth in models trained with a margin based SoftMax loss, the feature norm exhibits a trend that is correlated with the image quality. Here for ArcFace and AdaFace both loss functions exhibit this trend. Regardless of the form of the margin function, the correlation between the feature norm and the image quality is quite similar (upper plot in 1st and 2nd columns). This behavior is used to design the proxy for the image quality. In FIGS. 10A and 10B, a comparison between ArcFace and AdaFace on the correlation between the feature norm and the image quality. 1,534 randomly sampled images from the training dataset (MS1MV2) were used to form this plot.

Figure 11:
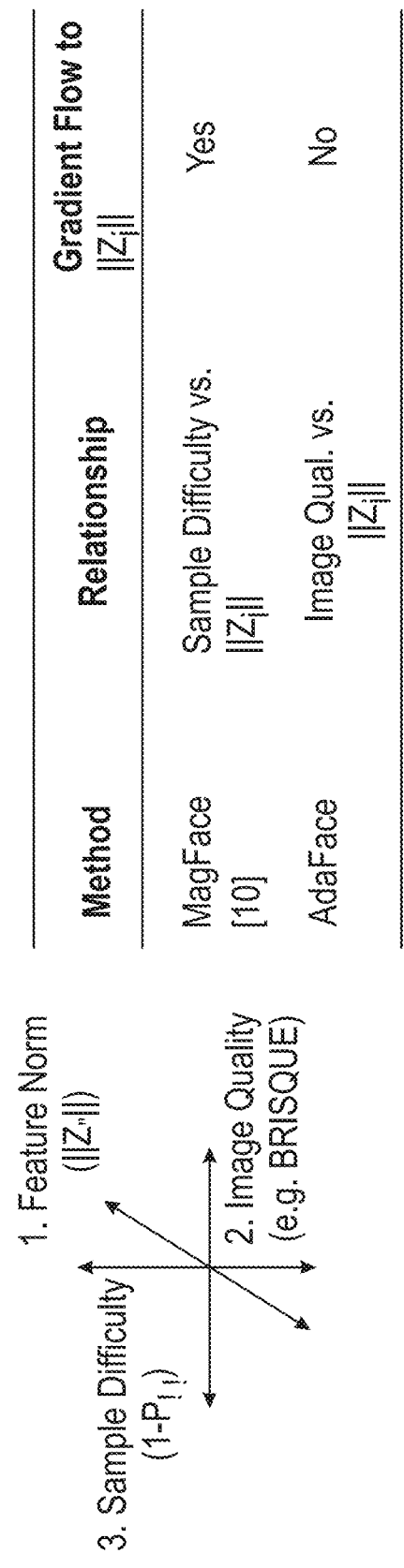
FIG. 11 is a plot illustrating feature norms, sample difficulty and image quality.

Note that three concepts (image quality, feature norm and sample difficulty) are used to describe a sample, as illustrated in FIG. 11. The correlation between the feature norm and the image quality to apply different emphasis to different difficulty of samples is shown. In contrast, MagFace learns a representation that aligns the feature norm with recognizability. The term, image quality in MagFace paper refers to the face recognizability, which is closer in meaning to the sample difficulty than the term, image quality. Further note the difference in gradient flow through the feature norm, ∥. MagFace relies on learning the feature that has $\|z_i\|$ aligned with the recognizability of the sample, requiring the gradient to flow through $\|z_i\|$ during backpropagation. The loss function has the incentive to reduce the margin by reducing $\|z_i\|$. However, our objective is to adaptively change the loss function, itself, so is treated $\|z_i\|$ as a constant. AdaFace substantially outperforms MagFace, e.g. reducing the errors of MagFace on IJB-B and IJB-C relatively by 21% and 23% respectively. An illustration of different components to describe a sample and their usage in previous works.

Referring now to FIG. 12 actual training data examples corresponding to 6 zones is set forth. A pretrained AdaFace model is used as a feature extractor. Some visualization of the actual training images is set forth on the right side. From the randomly sampled 1534 images from the training dataset (MS1MV2), the samples into 6 different zones. The samples were plotted by cos $\theta_{y_i}$ (decreasing) as the x axis and the feature norm $\|z_i\|$ as y-axis in FIG. 12. The plot was divided into 6 zones and sample a few images from each group. Clearly, there are not many samples in the zones highlighted in the top right 1210C and bottom left, 1210D. This indicates that the sample difficulty distribution is different for each level of feature norm. Furthermore, the samples in the area below the middle in 1210E and 1210F are mostly unrecognizable images. AdaFace de-emphasizes these samples. Also, the samples in the upper middle area 1210B are more difficult samples than the upper left area 1210A. AdaFace puts more emphasis on the harder samples when the feature norm is high. FIG. 12 is essentially an empirical validation of the two-dimensional face image categorization.

Figure 13A:
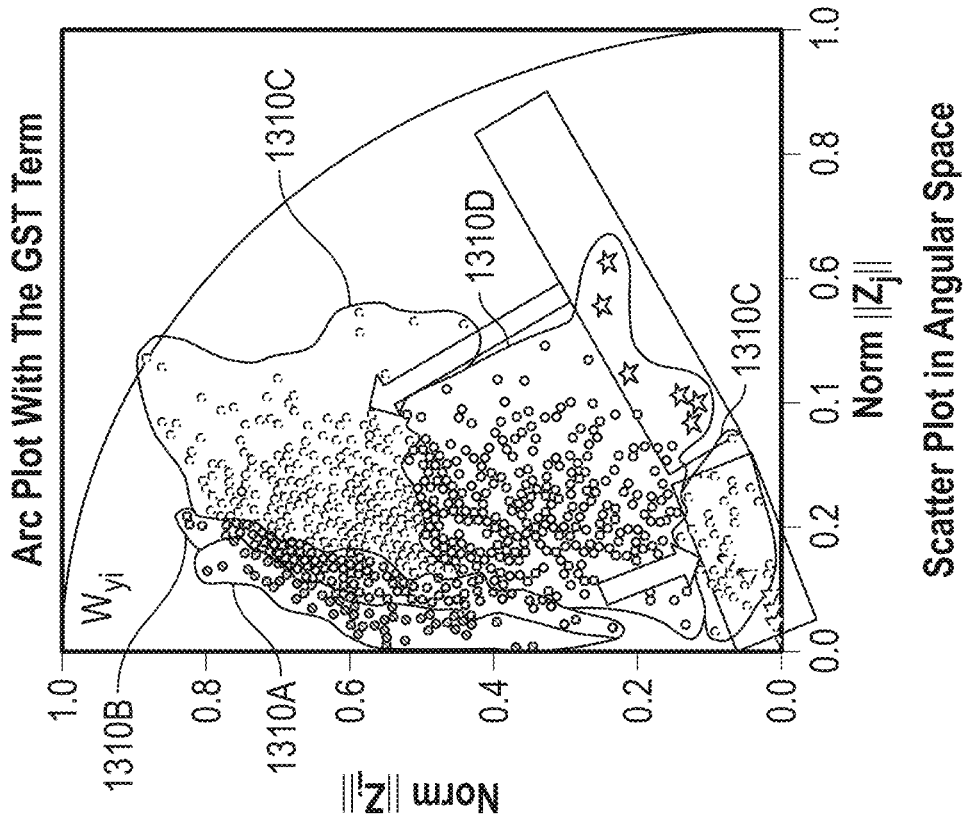
FIG. 13A is a scatter plot with samples from FIG. 12 that indicate the GST term by shading.
Figure 13B:
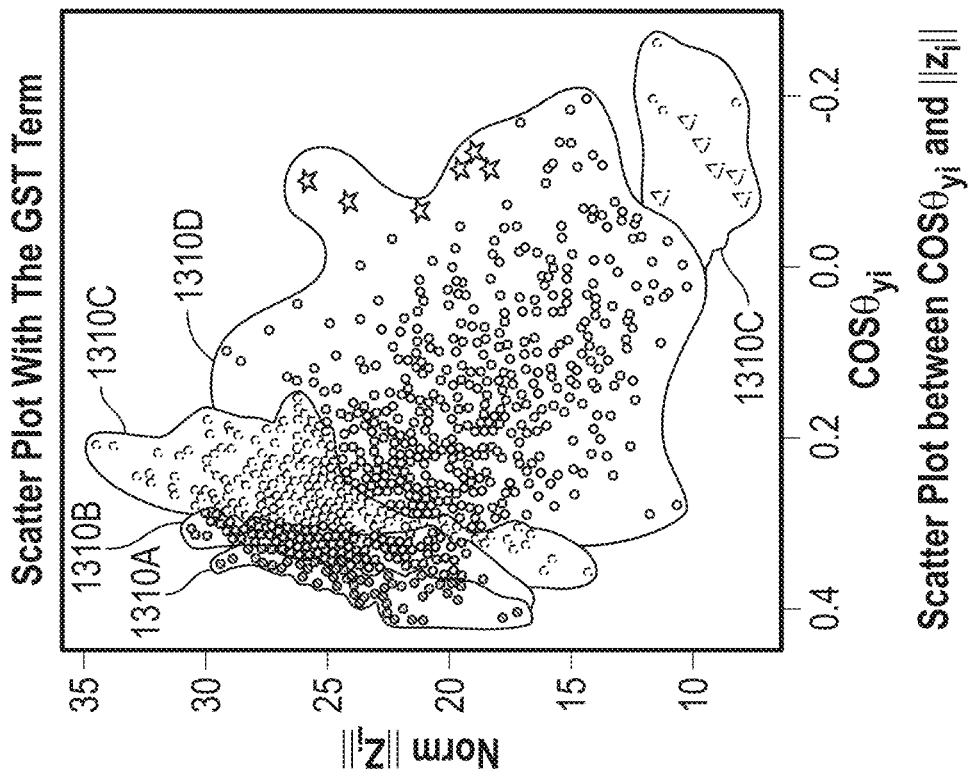
FIG. 13B is a scatter plot of the points of FIG. 13A in an angular space.

A description of the training samples' Gradient Scaling Term for AdaFace is set forth. FIG. 13A is a scatter plot of samples from FIG. 12 with the shading as the GST term. FIG. 13B is a scatter plot of the same 1,534 points in angular space. In FIG. 13A, 13B the regions 1310A, 1310B, 1310C and 1320D show an increase in GST from the previous region starting at 1310A. For each feature, the angle from $W_{y_i}$ is calculated from cos $\theta_{y_i}$ and the distance from the origin is calculated from $\|z_i\|$. Both terms are normalized for visualization. In FIG. 13C a sample image visualization from the low norm and high norm regions of similar cos $\theta_{y_i}$ is shown.

In FIG. 13A, the actual GST term for AdaFace is plotted. The same 1534 images from the training dataset (MS1MV2) are used from FIG. 12. The shading of points indicates the magnitude of the GST term. The darkest points on the left side of the scatter plot are samples past the decision boundary. Therefore, the magnitude of GST term is low. The effective difference in GST term for samples outside the decision boundary can be seen by the shading change from left to right. Note that AdaFace de-emphasizes samples of low feature norm and high difficulty. This is shown in the lower right region of the plot. In FIG. 13B, the plot is translated into the angular space to make a correspondence with FIG. 3 above, where the GST term for AdaFace is illustrated. How actual training samples are distributed in this angular space is shown. In FIGS. 13B and 13C, two groups of images are visualized where one is from the low feature norm area (triangle) and the other is from the high feature norm area (star). AdaFace exploits images that are hard yet recognizable, as indicated by the star regions, and lowers the learning signal from the unrecognizable images, as indicated by the triangle regions.

The image quality proxy $\|_dZ_i\|$ does not depend on batch size due to exponential moving average in Eq. 17 of the main paper (rewritten below).

The problem arising from unidentifiable face images in the training dataset is reduced. Data collection processes or data augmentations introduce the images in the training data. Motivated by the difference in recognizability based on image quality, the problem is reduced by using a feature norm as a proxy for the image quality and changing the margin function adaptively based on the feature norm to control the gradient scale assigned to different quality of images. The efficacy of the adaptive loss function on various qualities of datasets are used to achieve a state of the art for mixed and low-quality face datasets.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of training a facial recognition system with a plurality of image samples of a training set comprising:
    determining, at an image quality indicator of a controller, an image quality of each of the image samples in the training set based on a feature norm of each of the images in the training set;
    assigning a margin function to each of the image samples based on the image quality of each image sample at a margin function block of the controller;
    adaptively changing the margin function based on the feature norm to control a gradient scale assigned to different quality images so that high norm features have a higher gradient scale far away from a decision boundary, and low norm features have a higher gradient scale near the decision boundary;
    classifying the image samples in a classifier;
    determining a prediction of uncertainty of a facial recognition representation in a prediction block of the controller;
    determining a loss at an adaptive loss block of the controller based on the prediction and the margin function;
    generating gradients at a backbone and classifier of the controller based on the loss and the gradient scale; and
    changing weights in the backbone and classifier of the controller based on the gradients.

2. The method of claim 1 further comprising using the feature norm to determine low quality image samples.

3. The method of claim 1 wherein determining the image quality of the training set based on a feature norm of each of the images of the training set comprises determining a normalized feature norm.

4. The method of claim 3 wherein the normalized feature norm is based on a mean and standard deviation of all features within a batch of image samples.

5. The method of claim 4 further comprising determining an exponential moving average (EMA) of the mean and standard deviation across multiple steps to stabilize batch statistics.

6. The method of claim 4 further comprising clipping the normalized feature norm.

7. The method of claim 6 further comprising clipping the normalized feature norm between values of −1 and 1.

8. The method of claim 6 further comprising back propagating the gradients unless the normalized feature norm is clipped.

9. The method of claim 1 wherein determining a sample recognition difficulty comprises emphasizes hard samples for high-quality images and easy samples for low quality images.

10. The method of claim 1 wherein changing the gradients due to the margin function and scales an importance of the image sample relative to other image samples.

11. The method of claim 1 wherein assigning a margin function comprises assigning an angular margin to scale the image sample according to a sample difficulty.

12. The method of claim 1 wherein assigning the margin function assigning an angular margin and an additive margin.

13. A system for training a facial recognition system with a plurality of image samples of a training set comprising:
    a classifier;
    a controller programmed to determine an image quality of each of the image samples in the training set based on a feature norm of each of the images in the training set;
    assign a margin function to each of the image samples based on the image quality of each image sample at a margin function block of the controller;
    adaptively change the margin function based on the feature norm to control a gradient scale assigned to different quality images so that high norm features have a higher gradient scale far away from a decision boundary, and low norm features have a higher gradient scale near the decision boundary;
    classify the image samples in a classifier;
    determine a prediction;
    determine a loss based at an adaptive loss block of the controller on the prediction and the margin function;
    generate at a backbone and classifier of the controller based on the loss and the gradient scale; and
    change weights in the backbone and classifier of the controller based on the gradients.

14. The system of claim 13 wherein the controller is programmed to use the feature norm to determine low quality image samples.

15. The system of claim 13 wherein determining the image quality of the training set based on a feature norm of each of the images of the training set comprises determining a normalized feature norm.

16. The system of claim 15 wherein the normalized feature norm is based on a mean and standard deviation of all features within a batch of image samples.

17. The system of claim 16 wherein the controller is programmed to determine an exponential moving average (EMA) of the mean and standard deviation across multiple steps to stabilize batch statistics.

18. The system of claim 16 wherein the controller is programmed to clip the normalized feature norm.

19. The system of claim 18 wherein the controller is programmed to clip the normalized feature norm between values of −1 and 1.

20. The system of claim 18 wherein the controller is programmed to back propagate the gradients unless the normalized feature norm is clipped.

21. The system of claim 13 wherein the controller is programmed to determine a sample recognition difficulty by being programmed to emphasize hard samples for high-quality images and easy samples for low quality images.

22. The system of claim 13 wherein the controller is programmed to change the gradients due to the margin function and scale an importance of the image sample relative to other image samples.

23. The system of claim 13 wherein the controller is programmed to assign a margin function by being programmed to assign an angular margin to scale the image sample according to a sample difficulty.

24. The system of claim 13 wherein the controller is programmed to assign the margin function by being programmed to assign an angular margin and an additive margin.

25. The system of claim 13 wherein the controller is programmed to generate a higher gradient scale for high norm features far away from a decision boundary, and generating the higher gradient scale for low norm features near the decision boundary.

26. A method of training a facial recognition system with a plurality of image samples of a training set comprising:

determining an image quality of each of the image samples in the training set based on a feature norm of each of the images in the training set;

assigning a margin function to each of the image samples based on the image quality of each image sample at a margin function block of the controller;

adaptively changing the margin function based on the feature norm to control a gradient scale assigned to different quality images so that high norm features have a higher gradient scale far away from a decision boundary, and low norm features have a higher gradient scale near the decision boundary;

classifying the image samples in a classifier;

determining a loss function at an adaptive loss block of the controller based on the margin function;

generating gradients based on the loss function; and changing weights in the backbone and classifier of the controller based on the gradients.

* * * * *